(12) United States Patent
Chu

(10) Patent No.: US 11,851,097 B2
(45) Date of Patent: Dec. 26, 2023

(54) FOLDABLE TROLLEY

(71) Applicant: Weisha Chu, Qingdao (CN)

(72) Inventor: Weisha Chu, Qingdao (CN)

( * ) Notice: Subject to any disclaimer, the term of this patent is extended or adjusted under 35 U.S.C. 154(b) by 128 days.

(21) Appl. No.: 17/488,818

(22) Filed: Sep. 29, 2021

(65) Prior Publication Data

US 2022/0396299 A1    Dec. 15, 2022

(30) Foreign Application Priority Data

Jun. 10, 2021 (CN) .......................... 202110646041.8

(51) Int. Cl.
*B62B 3/02* (2006.01)
*B62B 3/00* (2006.01)
*B62B 5/06* (2006.01)

(52) U.S. Cl.
CPC ................ *B62B 3/02* (2013.01); *B62B 3/002* (2013.01); *B62B 5/061* (2013.01); *B62B 5/067* (2013.01); *B62B 2205/04* (2013.01); *B62B 2205/06* (2013.01)

(58) Field of Classification Search
CPC ........... B62B 3/02; B62B 3/002; B62B 3/007; B62B 3/022; B62B 5/061; B62B 5/067; B62B 7/08; B62B 2205/04; B62B 2205/06; B62B 2205/00; B62B 2205/02
See application file for complete search history.

(56) References Cited

U.S. PATENT DOCUMENTS

| | | | |
|---|---|---|---|
| 9,073,564 B2 * | 7/2015 | Yang ...................... | B62B 3/002 |
| 9,145,154 B1 * | 9/2015 | Horowitz .............. | B62B 5/0013 |
| 9,956,981 B1 * | 5/2018 | Fitzwater ................ | E04H 15/60 |
| 10,040,470 B1 * | 8/2018 | Horowitz ................ | B62B 3/102 |
| 10,099,711 B1 * | 10/2018 | Sun ......................... | B62B 3/007 |
| 10,399,586 B1 * | 9/2019 | Huang ...................... | B62B 5/06 |
| 10,501,103 B1 * | 12/2019 | Wang ...................... | B62B 3/007 |
| 10,953,903 B1 * | 3/2021 | Park ........................ | B62B 3/007 |
| 10,953,904 B1 * | 3/2021 | Sun ......................... | B62B 3/002 |
| 11,370,467 B1 * | 6/2022 | Horowitz ................ | B62B 3/007 |
| 2010/0090444 A1 * | 4/2010 | Chen ....................... | B62B 3/106 |
| | | | 280/651 |
| 2011/0204598 A1 * | 8/2011 | Stevenson ................ | B62B 3/02 |
| | | | 280/639 |

(Continued)

FOREIGN PATENT DOCUMENTS

| | | | | |
|---|---|---|---|---|
| CN | 109305205 A | * | 2/2019 | ............. B62B 3/007 |
| GB | 585540 A | * | 2/1947 | ............... B62B 3/02 |

*Primary Examiner* — Steve Clemmons
(74) *Attorney, Agent, or Firm* — Howard & Howard Attorneys PLLC

(57) ABSTRACT

The present application discloses a foldable trolley having a trolley frame, the trolley frame comprising: a front left strut assembly, a front right strut assembly, a rear left strut assembly, and a rear right strut assembly, each of which strut assemblies is provided with a top connector and a bottom connector movable axially relative to each other; a front end folding assembly configured to be coupled respectively to the top connectors and the bottom connectors of the front left strut assembly and the front right strut assembly and to be foldable in a widthwise direction of the trolley frame; a rear end folding assembly; a left side folding assembly; a right side folding assembly; and a chassis assembly configured to be foldable both in the widthwise and lengthwise directions of the trolley frame.

19 Claims, 16 Drawing Sheets

(56) References Cited

U.S. PATENT DOCUMENTS

| | | | |
|---|---|---|---|
| 2012/0187660 A1* | 7/2012 | Liao | B62B 7/086 |
| | | | 280/642 |
| 2015/0329135 A1* | 11/2015 | Sun | B62B 7/142 |
| | | | 280/649 |
| 2018/0170418 A1* | 6/2018 | Choi | C08L 63/00 |
| 2018/0327011 A1* | 11/2018 | Horowitz | B62B 3/025 |
| 2021/0086812 A1* | 3/2021 | Park | B62B 3/02 |
| 2022/0097748 A1* | 3/2022 | Ma | B62B 5/04 |

* cited by examiner

1130F

FOLDABLE TROLLEY

CROSS-REFERENCE TO RELATED APPLICATIONS

This application claims priority to and the benefit of Chinese Patent Application No. 202110646041.8 filed on Jun. 10, 2021, the contents of which are hereby incorporated herein by reference in their entirety.

FIELD

The present application relates to a foldable trolley, especially a retractable trolley frame of the foldable trolley.

BACKGROUND

A foldable trolley can be used in various applications. For instance, the foldable trolley when in an unfolded state can be used to carry cargos and/or person(s). The foldable trolley when in a folded state can occupy a smaller volume, such that the trolley itself can be conveniently stored or transported, for example placed in a motor vehicle's trunk. Therefore, main requirements for a foldable trolley, especially a household foldable trolley are that the trolley occupies a volume as small as possible in its folded state, and is as robust as possible and flexible and easy to use in its unfolded state, facilitating in carrying person(s) and/or cargos.

However, the requirements in the two different states are sometime mutually contradictory to each other. Therefore, designers are demanded to design a foldable trolley which is as retractable or foldable as possible in various directions and can be robust and durable enough in its unfolded state.

In designing a foldable trolley, the bearing capacity of a base of the trolley's frame is less considered. However, in consideration of the foldable trolley's carrying capacity, the amount of goods received by the trolley greatly depends on the bearing capacity of the base of the trolley's frame. Furthermore, when the foldable trolley is in its folded state, a user may move the trolley by pulling the same. Therefore, it is very practical to configure and design the trolley such that it can be readily pulled and thus moved in its folded state. Besides, other aspects of the foldable trolley such as the safeness and comfortness of the foldable trolley when used to carry person(s) shall be considered.

SUMMARY OF THE INVENTION

The present application is mainly aimed at proposing a novel foldable trolley which can be folded readily by users into a volume, as small as possible, used for storage and can be robust and strong enough when used in an unfolded state. Moreover, the proposed trolley can be operated conveniently and flexible in application.

According to one aspect of the present application, a foldable trolley having a trolley frame is provided, the trolley frame comprising:

a front left strut assembly, a front right strut assembly, a rear left strut assembly, and a rear right strut assembly, each of which strut assemblies is provided with a top connector and a bottom connector movable axially relative to each other;
  a front end folding assembly configured to be coupled respectively to the top connectors and the bottom connectors of the front left strut assembly and the front right strut assembly and to be foldable in a widthwise direction of the trolley frame;
  a rear end folding assembly configured to be coupled respectively to the top connectors and the bottom connectors of the rear left strut assembly and the rear right strut assembly and to be foldable in the widthwise direction of the trolley frame;
  a left side folding assembly configured to be coupled respectively to the top connectors and the bottom connectors of the front left strut assembly and the rear left strut assembly and to be foldable in a lengthwise direction of the trolley frame;
  a right side folding assembly configured to be coupled respectively to the top connectors and the bottom connectors of the front right strut assembly and the rear right strut assembly and to be foldable in the lengthwise direction of the trolley frame; and
  a chassis assembly configured to be coupled respectively to the bottom connectors of the front left strut assembly, the rear left strut assembly, the rear left strut assembly and the rear right strut assembly and respectively to the left side folding assembly and the right side folding assembly, and configured to be foldable both in the widthwise and lengthwise directions of the trolley frame,
wherein each of the front left strut assembly, the rear left strut assembly, the rear left strut assembly and the rear right strut assembly comprises a telescopic rod assembly configured to include an interior rod and a hollow exterior rod in which the interior rod is axially slidable, the respective top connector is secured on an upper end of the interior rod and the respective bottom connector is secured on a lower end of the exterior rod, and wherein in the process that the foldable trolley is being folded for storage, the bottom connectors are axially immovable relative to the respective strut assemblies. As the respective bottom connectors are kept to be axially stationary during the trolley frame being folded, the bearing capacity and firmness of the entire trolley frame can be improved.

Optionally, the front end folding assembly is configured to include:

a foldable upper connection beam comprised of a left connection beam section and a right connection beam section hingedly coupled to each other, wherein the left connection beam is hingedly coupled with an upper cross-rod and a slant rod in such a way that the upper cross-rod is also hingedly coupled to the top connector of the front left strut assembly and the slant rod is also hingedly coupled to the bottom connector of the front left strut assembly, and the right connection beam is hingedly coupled with an upper cross-rod and a slant rod in such a way that the upper cross-rod is also hingedly coupled to the top connector of the front right strut assembly and the slant rod is also hingedly coupled to the bottom connector of the front right strut assembly;
  a carrier located below the upper connection beam;
  a first bottom support beam and a second bottom support beam, wherein the first bottom support beam is configured to include a first end and the second bottom support beam is configured to include a first end, both of which first ends are hingedly coupled to each other between the upper connection beam and the carrier, the first bottom support beam is configured to include a second end opposing its first end and the second support beam is configured to include a second end opposing its first end, the second end of the first bottom support beam is hingedly coupled to the bottom connector of the front right strut assembly and the second end of the second bottom support beam is hingedly coupled to the bottom connector of the front left strut assembly;

a first bottom connection beam and a second bottom connection beam, wherein the first bottom connection beam is hingedly coupled between the first bottom support beam and the carrier and the second bottom connection beam is hingedly coupled between the second bottom support beam and the carrier; and a first lower cross-rod and a second lower cross-rod, wherein the first lower cross-rod is hingedly coupled between the first bottom support beam and a slip ring of the front right strut assembly which is linearly slidable relative to its exterior rod, and the second lower cross-rod is hingedly coupled between the second bottom support beam and a slip ring of the front left strut assembly which is linearly slidable relative to its exterior rod. Such rod-beam structural design of the front end folding assembly ensures that there are several triangle connection structures distributed symmetrically between two strut assemblies. Those triangle connection structures will enable the front end folding assembly to be more robust in its unfolded state.

In the context of the present application, a feature A being connected between a feature B and a feature C may means that the feature A is located between the feature B and the feature C and is connected to both of the features B and C.

Optionally, the rear end folding assembly is configured to include:

a foldable upper connection beam comprised of a left connection beam section and a right connection beam section hingedly coupled to each other, wherein the left connection beam is hingedly coupled with an upper cross-rod and a slant rod in such a way that the upper cross-rod is also hingedly coupled to the top connector of the rear left strut assembly and the slant rod is also hingedly coupled to the bottom connector of the rear left strut assembly, and the right connection beam is hingedly coupled with an upper cross-rod and a slant rod in such a way that the upper cross-rod is also hingedly coupled to the top connector of the rear right strut assembly and the slant rod is also hingedly coupled to the bottom connector of the rear right strut assembly;

a carrier located below the upper connection beam;

a first bottom support beam and a second bottom support beam, wherein the first bottom support beam is configured to include a first end and the second bottom support beam is configured to include a first end, both of which first ends are hingedly coupled to each other between the upper connection beam and the carrier, the first bottom support beam is configured to include a second end opposing its first end and the second support beam is configured to include a second end opposing its first end, the second end of the first bottom support beam is hingedly coupled to the bottom connector of the rear right strut assembly and the second end of the second bottom support beam is hingedly coupled to the bottom connector of the rear left strut assembly;

a first bottom connection beam and a second bottom connection beam, wherein the first bottom connection beam is hingedly coupled between the first bottom support beam and the carrier and the second bottom connection beam is hingedly coupled between the second bottom support beam and the carrier; and a first lower cross-rod and a second lower cross-rod, wherein the first lower cross-rod is hingedly coupled between the first bottom support beam and a slip ring of the rear right strut assembly which is linearly slidable relative to its exterior rod, and the second lower cross-rod is hingedly coupled between the second bottom support beam and a slip ring of the rear left strut assembly which is linearly slidable relative to its exterior rod. Similar to the front end folding assembly, such rod-beam structural design of the rear end folding assembly ensures that there are several triangle connection structures distributed symmetrically between two strut assemblies. Those triangle connection structures will enable the rear end folding assembly to be more robust in its unfolded state.

Optionally, the left side folding assembly is configured to include a middle telescopic rod assembly and a first intersecting rod assembly and a second intersecting rod assembly, which first intersecting rod assembly and which second intersecting rod assembly are hingedly coupled respectively to opposing ends of the middle telescopic rod assembly, the middle telescopic rod assembly is configured to include an interior rod and an exterior tube configured to be sleeved on the interior rod in such a way that they are linearly slidable relative to each other, wherein the inner rod has a bottom end defining the end to which the first intersecting rod assembly and the second intersecting rod assembly are hingedly coupled, and the exterior tube has a top end defining the other end to which the first intersecting rod assembly and the second intersecting rod assembly are hingedly coupled;

the first intersecting rod assembly is configured to include a first rod and a second rod intersecting with each other and hingedly coupled to each other at an intersecting location therebetween, wherein the first rod of the first intersecting rod assembly is configured to include a first end hingedly coupled to the top connector of the front left strut assembly and an opposing second end hingedly coupled to the middle telescopic rod assembly, and the second rod of the first intersecting rod assembly is configured to include a first end hingedly coupled to the bottom connector of the front left strut assembly and an opposing second end hingedly coupled to the middle telescopic rod assembly;

the second intersecting rod assembly is configured to include a first rod and a second rod intersecting with each other and hingedly coupled to each other at an intersecting location therebetween, wherein the first rod of the second intersecting rod assembly is configured to include a first end hingedly coupled to the top connector of the rear left strut assembly and an opposing second end hingedly coupled to the middle telescopic rod assembly, and the second rod of the second intersecting rod assembly is configured to include a first end hingedly coupled to the bottom connector of the rear left strut assembly and an opposing second end hingedly coupled to the middle telescopic rod assembly.

Optionally, the right side folding assembly is configured to include a middle telescopic rod assembly and a first intersecting rod assembly and a second intersecting rod assembly, which first intersecting rod assembly and which second intersecting rod assembly are hingedly coupled respectively to opposing ends of the middle telescopic rod assembly, the middle telescopic rod assembly of the right side folding assembly is configured to include an interior rod and an exterior tube configured to be sleeved on the interior rod in such a way that they are linearly slidable relative to each other, wherein the inner rod has a bottom end defining the end to which the first intersecting rod assembly of the right side folding assembly and the second intersecting rod assembly of the right side folding assembly are hingedly coupled, and the exterior tube has a top end defining the other end to which the first intersecting rod assembly of the right side folding assembly and the second intersecting rod assembly of the right side folding assembly are hingedly coupled;

the first intersecting rod assembly of the right side folding assembly is configured to include a first rod and a second rod intersecting with each other and hingedly coupled to each other at an intersecting location therebetween, wherein the first rod of the first intersecting rod assembly is configured to include a first end hingedly coupled to the top connector of the front right strut assembly and an opposing second end hingedly coupled to the middle telescopic rod assembly, and the second rod of the first intersecting rod assembly of the right side folding assembly is configured to include a first end hingedly coupled to the bottom connector of the front right strut assembly and an opposing second end hingedly coupled to the middle telescopic rod assembly;

the second intersecting rod assembly of the right side folding assembly is configured to include a first rod and a second rod intersecting with each other and hingedly coupled to each other at an intersecting location therebetween, wherein the first rod of the second intersecting rod assembly is configured to include a first end hingedly coupled to the top connector of the rear right strut assembly and an opposing second end hingedly coupled to the middle telescopic rod assembly, and the second rod of the second intersecting rod assembly of the right side folding assembly is configured to include a first end hingedly coupled to the bottom connector of the rear right strut assembly and an opposing second end hingedly coupled to the middle telescopic rod assembly.

Optionally, the chassis assembly is configured to include: a first chassis sub-assembly and a second chassis sub-assembly hingedly coupled to each other, wherein the first chassis sub-assembly is hingedly coupled to the bottom connectors of the front left and right strut assemblies and the carrier of the front end folding assembly, and the second chassis sub-assembly is hingedly coupled to the bottom connectors of the rear left and right strut assemblies and the carrier of the rear end folding assembly. Such design of the chassis assembly facilitates in ensuring the folding and increasing the bearing capacity.

Optionally, the first chassis sub-assembly is configured to include a first rod piece, a second rod piece, a third rod piece, and a fourth rod piece, wherein the first rod piece is configured to intersect with the second rod piece and be hingedly coupled to the second rod piece at an intersecting location therebetween, and wherein the third rod piece is configured to intersect with the fourth rod piece and be hingedly coupled to the fourth rod piece at an intersecting location therebetween;

the second chassis sub-assembly is configured to include a first rod piece, a second rod piece, a third rod piece, and a fourth rod piece, wherein the first rod piece is configured to intersect with the second rod piece and be hingedly coupled to the second rod piece at an intersecting location therebetween, and wherein the third rod piece is configured to intersect with the fourth rod piece and be hingedly coupled to the fourth rod piece at an intersecting location therebetween.

Optionally, the first rod piece of the first chassis sub-assembly is configured to include a first end hingedly coupled to the bottom connector of the front left strut assembly, each of the second and third rod pieces of the first chassis sub-assembly is configured to include a first end hingedly coupled to the carrier of the front end folding assembly, and the fourth rod piece of the first chassis sub-assembly is configured to include a first end hingedly coupled to the bottom connector of the front right strut assembly;

the first rod piece of the second chassis sub-assembly is configured to include a first end hingedly coupled to the bottom connector of the rear left strut assembly, each of the second and third rod pieces of the second chassis sub-assembly is configured to include a first end hingedly coupled to the carrier of the rear end folding assembly, and the fourth rod piece of the second chassis sub-assembly is configured to include a first end hingedly coupled to the bottom connector of the rear right strut assembly;

the first chassis sub-assembly is hingedly coupled to the second chassis sub-assembly by their respective first rod pieces, second rod pieces, third rod pieces and fourth rod pieces at opposing second ends of the respective rod pieces.

Optionally, a pivot axis defined between the first ends of the first, second, third, and fourth rod pieces of the first chassis sub-assembly and the front left strut assembly, the front end folding assembly, the front right strut assembly; a pivot axis defined between the first ends of the first, second, third, and fourth rod pieces of the second chassis sub-assembly and the rear left strut, rear end folding, rear right strut assemblies; and a pivot axis defined between the first chassis sub-assembly and the second chassis sub-assembly are parallel or substantially parallel to each other.

Optionally, the second end of the second rod piece of the first chassis sub-assembly and the second end of the second rod piece of the second chassis sub-assembly together are hingedly coupled to a slide bushing which is provided on the middle telescopic rod assembly of the left side folding assembly in such a way that the slide bushing is linearly slidable on the middle telescopic rod assembly;

the second end of the third rod piece of the first chassis sub-assembly and the second end of the third rod piece of the second chassis sub-assembly together are hingedly coupled to a slide bushing which is provided on the middle telescopic rod assembly of the right side folding assembly.

Optionally, the slide bushing of the left side folding assembly is sleeved on the exterior tube of the middle telescopic rod assembly of the left side folding assembly; and the slide bushing of the right side folding assembly is sleeved on the exterior tube of the middle telescopic rod assembly of the right side folding assembly.

Optionally, the foldable trolley is further configured to include an auxiliary cross-bar support assembly to support the chassis assembly thereunderneath when the trolley frame is in its unfolded state, the auxiliary cross-bar support assembly is configured to include a first bar and a second bar, a first end of the first bar is hingedly coupled to a first end of the second bar, an opposing second end of the first bar is hingedly coupled to the bottom end of the interior rod of the middle telescopic rod assembly of the left side folding assembly, and an opposing second end of the second bar is hingedly coupled to the bottom end of the interior rod of the middle telescopic rod assembly of the right side folding assembly. The auxiliary cross-bar support assembly is used to improve the bearing capacity of the chassis assembly further, so as to enable the trolley to carry more heavy articles.

Optionally, each of the rear left strut assembly and the rear right strut assembly is configured to include a handle grip rod assembly which is parallel or substantially parallel to the telescopic rod assembly of the respective strut assembly, a wheel assembly connected to the rear left strut assembly and a wheel assembly connected to the rear right strut assembly have a common rotational axis which is located between a longitudinal central axis of the telescopic rod assembly of the rear left strut assembly and a longitudinal central axis of the respective handle grip rod assembly of the rear left strut assembly and between a longitudinal central axis of the telescopic rod assembly of the rear right strut assembly and a longitudinal central axis of the respective handle grip rod assembly of the rear right strut assembly. In this way, the rear left and right strut assemblies can be more resistant to a more lateral force. That is to say, the structural firmness of the frame when bearing the lateral force can be improved.

Optionally, the foldable trolley is further configured to include a handle grip assembly foldable in the widthwise direction of the trolley frame, and the handle grip assembly is configured to be hingedly coupled to the handle grip rod assembly of the rear left strut assembly and the handle grip rod assembly of the rear right strut assembly.

Optionally, the foldable trolley is further configured to include a pull rod assembly, which pull rod assembly is configured to include a first end hingedly coupled to the carrier of the front end folding assembly and an opposing second end adaptable to be gripped by a user's hand.

Optionally, the pull rod assembly is configured to include two outer rods spaced from each other and an inner double-rod piece installed between the outer rods and linearly slidable relative to the outer rods;
   the upper connection beam of the front end folding assembly is provided with a holder configured to be in selective engagement with the inner double-rod piece.

Optionally, the foldable trolley is further configured to include an auxiliary extensible bracket foldable in the widthwise direction of the trolley frame, and the auxiliary extensible bracket is configured to be hingedly coupled to the handle grip rod assemblies of the rear left and right strut assemblies respectively adjacent to the bottom connectors of the rear left and right strut assemblies.

Using the technical solutions described in the present application, the foldable trolley can be ensured to be stored in a manner which it will occupy a volume/space as small as possible. Moreover, the foldable trolley in its unfolded state can have a higher bearing capacity and is more strong and robust.

BRIEF DESCRIPTION OF THE DRAWINGS

The principles and other aspects of the present application will be well understood by the following detailed description in combination with the attached drawings. It is noted that although the drawings may be given in different ratios for clarity, they do not affect understanding to the present application. In the drawings.

DETAILED DESCRIPTION OF THE INVENTION

Figure 1:
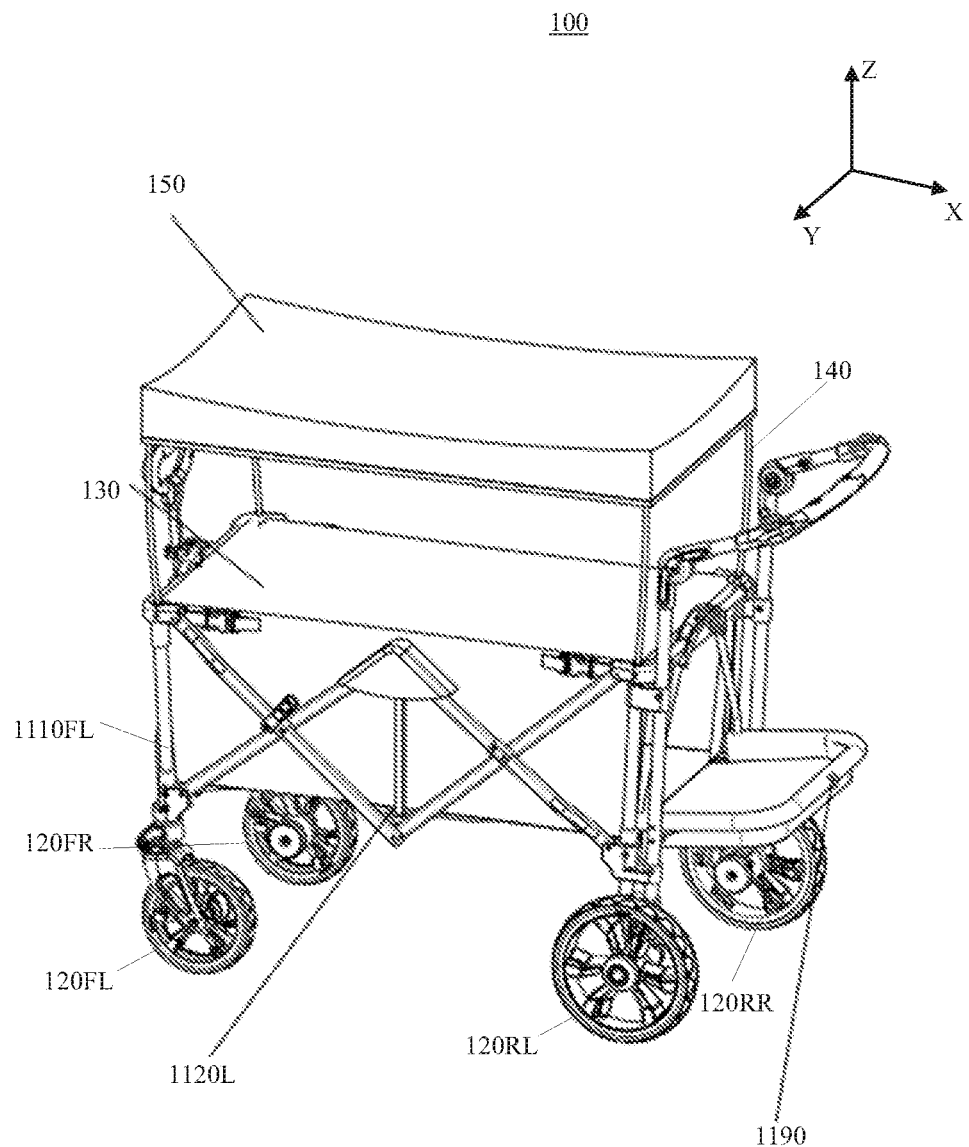
FIG. 1 is a perspective view schematically illustrating a foldable trolley according to an embodiment of the present application, wherein a trolley frame of the foldable trolley is in its unfolded state.

In the drawings of the present application, features having the same configuration or similar functions are represented by the same reference numerals respectively.

FIG. 1 schematically shows a foldable trolley 100 according to one embodiment of the present application. The foldable trolley 100 is configured to include a trolley frame 110; four wheel assemblies 120FL, 120FR, 120RL and 120RR respectively installed on a base of the trolley frame 110; a cloth assembly 130 removably attached to the trolley frame 110; four awning supporting rod assemblies 140 respectively installed at four corners of the trolley frame 110 such that they are vertical from the corners; and a shelter awning 150 detachably supported by the awning supporting rod assemblies 140.

For the sake of clarity, a Cartesian coordinate system XYZ is represented in FIG. 1, the direction of X-axis of which system is parallel or substantially parallel to a front-rear direction of the foldable trolley 100 or parallel or substantially parallel to a lengthwise direction of the trolley frame 110, the direction of Y-axis of which system is parallel or substantially parallel to a widthwise direction of the foldable trolley 100 or parallel or substantially parallel to a widthwise direction of the trolley frame 110, and the direction of Z-axis of which system is parallel or substantially parallel to a heightwise direction of the foldable trolley 100 or parallel or substantially parallel to a heightwise direction of the trolley frame 110. Furthermore, in the context of the present application, one feature being moved in a direction means that the feature being moved along the direction or parallel to the direction. The definition of the Cartesian coordinate system XYZ also applies for the other drawings of the present application. In the context of the present application, the term "front" or "rear" is only a relative directional concept, and does not means that a direction that has to be followed by a user who is operating the foldable trolley. In fact, the terms "front" and "rear" can be swapped with each other. Similarly, the term "left" or "right" is only a relative directional concept. The terms "above" or "below" and "top" or "bottom" are relative directional concepts with respect to the direction of gravity.

Figure 2:
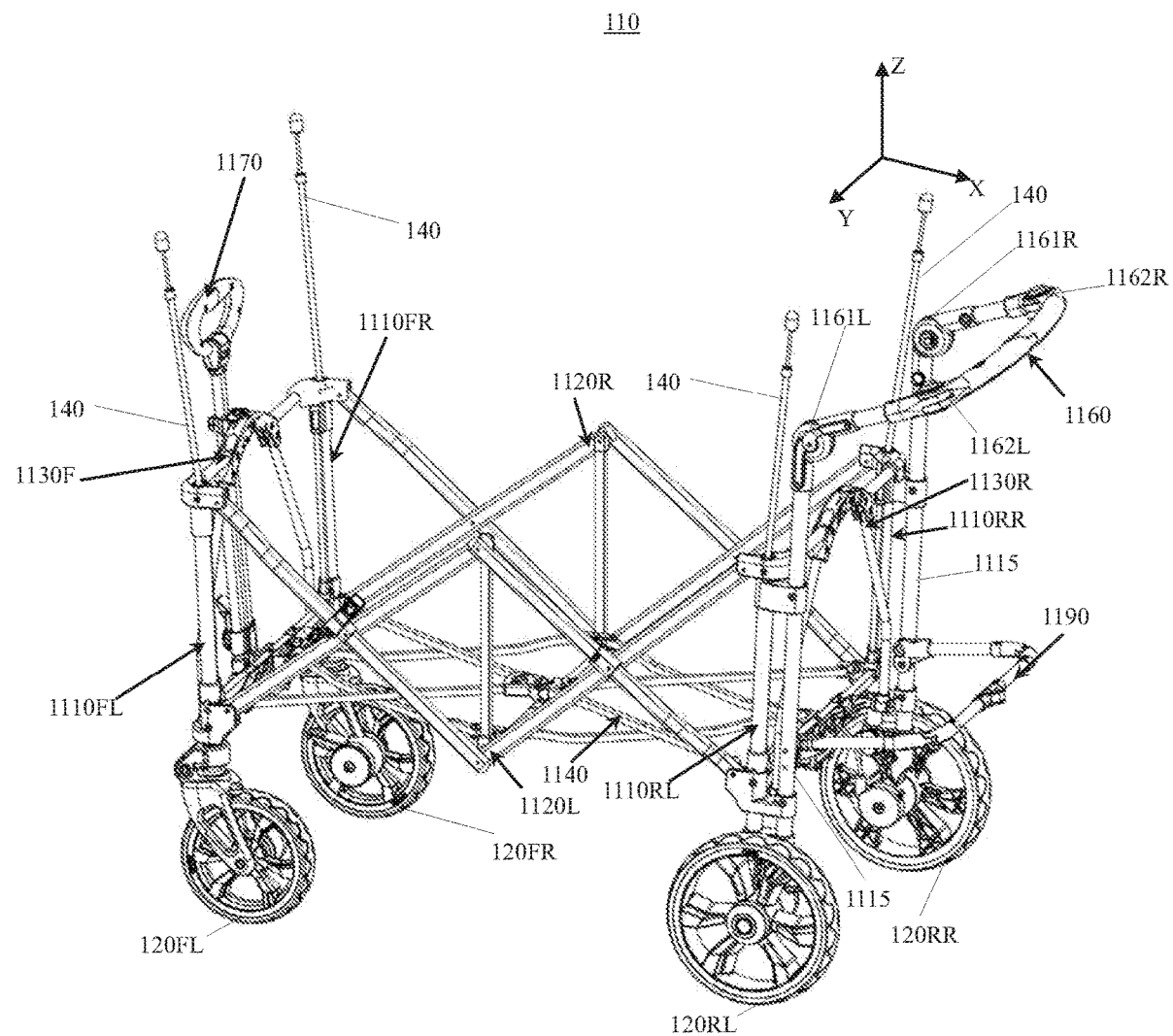
FIG. 2 is a perspective view schematically illustrating the trolley frame of the foldable trolley according to the embodiment of the present application, wherein the trolley frame is in its unfolded state.

Further as shown by FIG. 2, the trolley frame 110 of the foldable trolley 100 according to the embodiment of the present application can be seen, wherein the trolley frame 110 is installed with the four wheel assemblies 120FL, 120FR, 120RL, 120RR and the four awning supporting rod assemblies 140 as shown by FIG. 1. The trolley frame 110 is configured to mainly include four strut assemblies 1110FL, 1110FR, 1110RL, 1110RR; and two side folding assemblies 1120L, 1120R and two end folding assemblies 1130F, 1130R, which side and end folding assemblies are connected to the four strut assemblies 1110FL, 1110FR, 1110RL, 1110RR respectively. The trolley frame 110 is also configured to include a chassis assembly 1140 connected to bottom ends of the four strut assemblies 1110FL, 1110FR, 1110RL, 1110RR and cooperating with the side folding assemblies 1120L, 1120R respectively.

In the context of the present application, the symbol "F" in a reference numeral may refer to a "front" feature; the symbol "R" in a reference numeral may refer to a "rear" or "right" feature; and the symbol "L" in a reference numeral may refer to a "left" feature. For example, the reference numeral "1110FL" refers to the front left strut assembly of the trolley frame 110; and the reference numeral "1110FR" refers to the front right strut assembly of the trolley frame 110.

Figure 5:
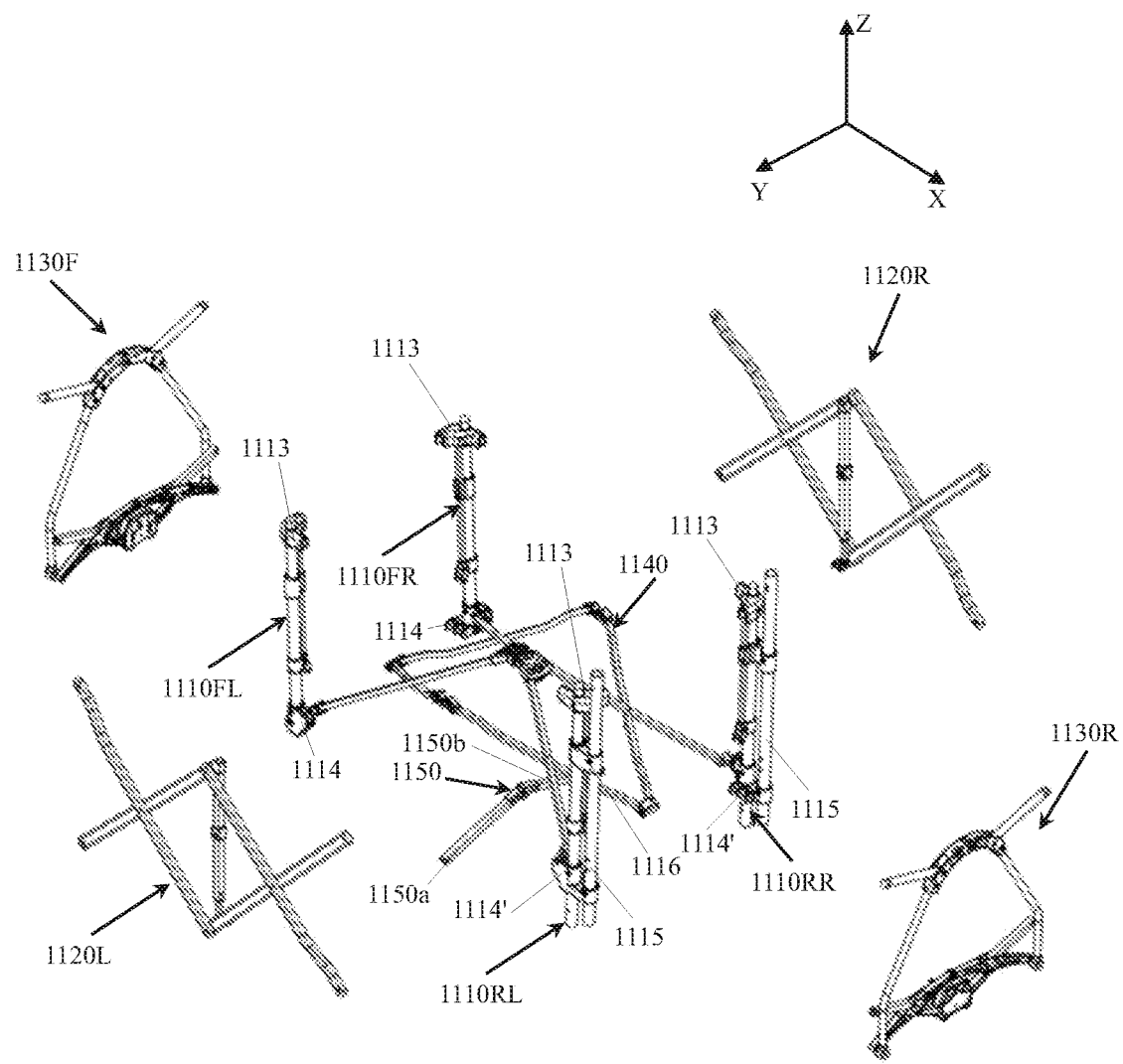
FIG. 5 is an exploded and perspective view schematically illustrating some main components of the trolley frame.

Especially, as shown by FIG. 5, the four strut assemblies 110FL, 110FR, 1110RL, 1110RR are installed in such a way that they substantially stand upright with respect to the ground. In the meanwhile, the front end folding assembly 1130F is installed between the two strut assemblies 1110FL, 1110FR; the rear end folding assembly 1130R is installed between the two strut assemblies 1110RL, 1110RR; the left side folding assembly 1120L is installed between the two strut assemblies 1110FL, 1110RL; and the right side folding assembly 1120R is installed between the two strut assemblies 1110FR, 1110RR. The chassis assembly 1140 can be connected to the bottom ends of the four strut assemblies 1110FL, 1110FR, 1110RL, 1110RR and are configured to cooperate with the two side folding assemblies 1120L, 1120L respectively. The four wheel assemblies 120FL, 120FR, 120RL, 120RR are installed at the respective bottom ends of the strut assemblies 1110FL, 1110FR, 1110RL, 1110RR respectively.

Figure 6:
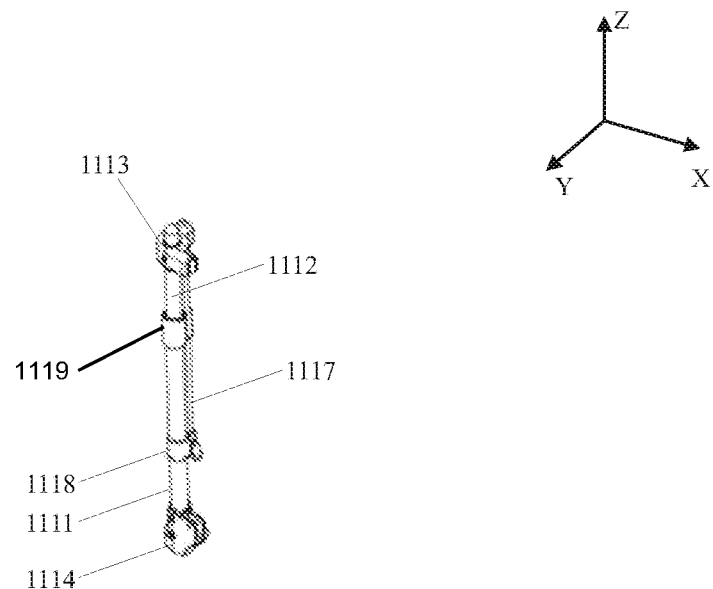
FIG. 6 is a perspective view schematically illustrating a strut assembly, especially a front strut assembly, of the trolley frame.

Each of the strut assemblies 1110FL, 1110FR, 1110RL, 1110RR is mainly a strut piece assembly. In the context of the present application, as required, the strut piece can be understood as a solid strut/rod piece or a hollow strut/rod piece, for example a tube. In a preferred embodiment, the tube mentioned here can be a light metal tube such as an aluminum tube or a thin-walled stainless steel tube or the like. Take FIG. 6 for example to illustrate one strut assembly according to the present application, for example the front left strut assembly 1110FL. It should be understood by the ordinary person in the art that the other strut assembly for example the front right strut assembly 1110FR can be configured in a manner similar to the front left strut assembly 1110FL; however, the two strut assemblies are mirror-symmetrical to each other with respect to a vertical central plane of the trolley frame 110. Therefore, the contents (including any structural features) described for the front left strut assembly 1110FL also apply for the front right strut assembly 1110FR.

The front left strut assembly 1110FL is configured to include a telescopic rod assembly configured to be telescopic longitudinally. For instance, the telescopic rod assembly is configured to include an interior rod 1112 and an exterior rod 1111 which is designed to be hollow. The interior rod 1112 is configured to be inserted into a hollow structure of the exterior rod 1111 in such a way that the former is linearly slidable relative to the latter. For example, a fastener piece can be disposed between the exterior rod 1111 and the interior rod 1112, so as to selectively lock the two rods longitudinally. For instance, the fastener piece can be a screwed piece passing through the exterior rod 1111. The screwed piece is arranged perpendicularly relative to a longitudinal direction of the telescopic rod assembly and is configured to be moved towards the interior rod 1112, so as to contact it, or away from the interior rod 1112 selectively by rotating the screwed piece. Additionally, in order to increase the support robustness and the sliding safeness of the assembly, a support rod 1117 is secured parallel relative to the interior rod 1112. The support rod 1117 has one end secured relative to the interior rod 1112 and the other end secured on a slip ring 1118 which is linearly slidable relative to the exterior rod 1111. For instance, the slip ring 1118 is sleeved about an external surface of the exterior rod 1111 in such a way that the slip ring is axially slidable along the same. Additionally, the support rod 1117 can be configured to pass through a guide part 1119 secured at one end of the exterior rod 1111 and is guided by the guide part, such that the telescoping reliability and the structural firmness of the telescopic rod assembly can be guaranteed.

A top connector 1113 is provided at a top end of the telescopic rod assembly, and a bottom connector 1114 is provided at a bottom end of the telescopic rod assembly. The top end of the telescopic rod assembly is defined by an upper end/top end of the interior rod 1112, and the bottom end of the telescopic rod assembly is defined by a lower end/bottom end of the exterior rod 1111. The top connector 1113 and the bottom 1114 are configured to be fastened adjacent to the respective ends of the telescopic rod assembly for example by screws respectively. The top connector 1113 and the bottom connector 1114 are configured to be hingedly coupled to respective parts of the front end folding assembly 1130F such that when a longitudinal axis of the front left strut assembly 1110FL is parallel or substantially parallel to the direction of Z-axis, shrinkage or expansion of the frond end folding assembly 1130F will enable the front left strut assembly 1110FL to move in the direction of y-axis. The top connector 1113 and the bottom connector 1114 are also configured to be hingedly coupled to respective parts of the left side folding assembly 1120L such that when a longitudinal axis of the front left strut assembly 1110FL is parallel or substantially parallel to the direction of Z-axis, shrinkage or expansion of the left side folding assembly 1120L will enable the front left strut assembly 1110FL to move in the direction of X-axis. In the front left strut assembly 1110FL, the bottom connector 1114 is located adjacent to and above a bottom end of the corresponding wheel assembly 120FL on which the bottom connector 1114 is installed. It can be seen that the slip ring 1118 is defined in such a way that it is axially slidable back and forth only between the guide part 1119 and the bottom connector 1114.

Further as shown by FIG. 5, the rear left strut assembly 1110RL is configured to include a first telescopic rod assembly and a handle grip rod assembly 1115 secured parallel or substantially parallel to the first telescopic rod assembly. The first telescopic rod assembly of the rear left strut assembly 1110RL can be configured in a manner similar to the already mentioned telescopic rod assembly of the front left strut assembly 1110FL. The handle grip rod assembly 1115 for example can be a single rod piece, or a hollow tube, secured parallel or substantially parallel to the first telescopic rod assembly. For instance, the first telescopic rod assembly of the rear left strut assembly 1110RL is configured to include a top connector 1113 and a bottom connector 1114'. The top connector 1113 and the bottom connector 1114' can be configured to be hingedly coupled to respective parts of the left side folding assembly 1120L and of the rear end folding assembly 1130R, in a manner similar to how the top and bottom connectors 1113 and 1114 are hingedly coupled to the left side and front end folding assemblies. Therefore, when a longitudinal axis of the rear left strut assembly 1110RL is parallel or substantially parallel to the direction of Z-axis, shrinkage or expansion of the left side folding assembly 1120L will enable the rear left strut assembly 1110RL to move in the direction of X-axis; and/or, shrinkage or expansion of the rear end folding assembly 1130R will enable the rear left strut assembly 1110RL to move in the direction of Y-axis.

Similarly, the bottom connector 1114 of the front left strut assembly 1110FL and the bottom connector 1114' of the rear left strut assembly 1110RL are also configure to be hingedly coupled to respective parts of the chassis assembly 1140 such that shrinkage or expansion of the chassis assembly 1140 will enable the front left strut assembly 1110FL and the rear left strut assembly 1110RL to move both in the direction of X-axis and the direction of Y-axis.

The handle grip rod assembly 1115 of the rear left strut assembly 1110RL is configured to be secured parallel relative to the first telescopic rod assembly of the rear left strut assembly 1110RL via the bottom connector 1114'. Further, between the top connector 1113 and the bottom connector 1114' of the first telescopic rod assembly of the rear left strut assembly 1110RL, a connection part 1116 is fastened to both of the first telescopic rod assembly and the handle grip rod assembly 1115 of the rear left strut assembly 1110RL, ensuring that the two assemblies can be secured parallel to each other. For instance, the connection part 1116 can be fastened to the first telescopic rod assembly and the handle grip rod assembly 1115 of the rear left strut assembly 1110RL by any suitable fastening part such as a screw. A top end of the handle grip rod assembly 1115 is for example configured to be connected to a part of a handle grip assembly 1160.

The rear left strut assembly 1110RL and the rear right strut assembly 1110RR achieves a double-parallel-rod design such that when the wheel assembly 120RL or 120RR is connected to the bottom end of the corresponding strut assembly, a common rotational axis about which the two wheel assemblies 120RL and 120RR (parallel to the direction of Y-axis) rotate is located between the first telescopic rod assembly and the handle grip rod assembly 1115, viewed in an XZ plane. That is to say, the common rotational axis of the wheel assemblies 120RL and 120RR is located between a longitudinal central axis of the first telescopic rod assemblies of the rear left strut assembly 1110RL and the rear right strut assembly 1110RR and a longitudinal central axis of the handle grip rod assembly 1115. The wheel assemblies 120RL and 120RR are designed to be rotatable only about a rotational axis parallel to the direction of Y-axis. Therefore, this rotational axis is designed to be located between the longitudinal central axis of the first telescopic rod assembly and the longitudinal central axis of the handle grip rod assembly 1115 in the XZ plane so as to increase the capability of adapting the rear left strut assembly 1110RL and the rear right strut assembly 1110RR to a lateral force exerted parallel to the direction of Y-axis. That is to say, the structural firmness when being imparted by the lateral force can be improved.

Figure 3:
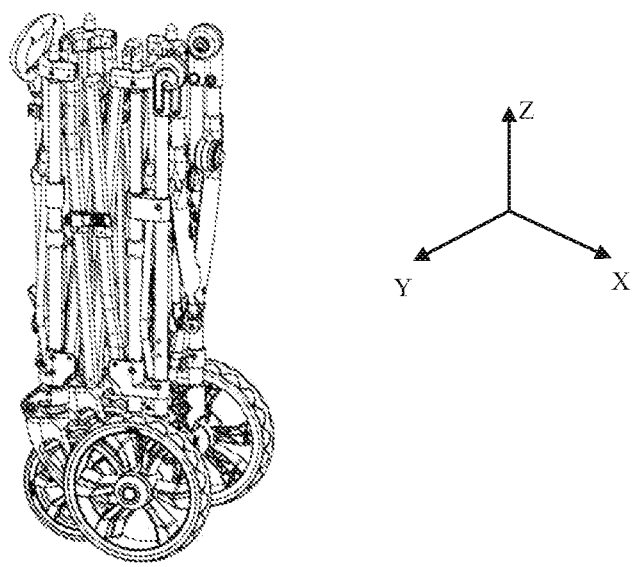
FIG. 3 is a perspective view schematically illustrating the trolley frame of the foldable trolley according to the embodiment of the present application, wherein the trolley frame is in its storage state, i.e. completely folded state.
Figure 4:
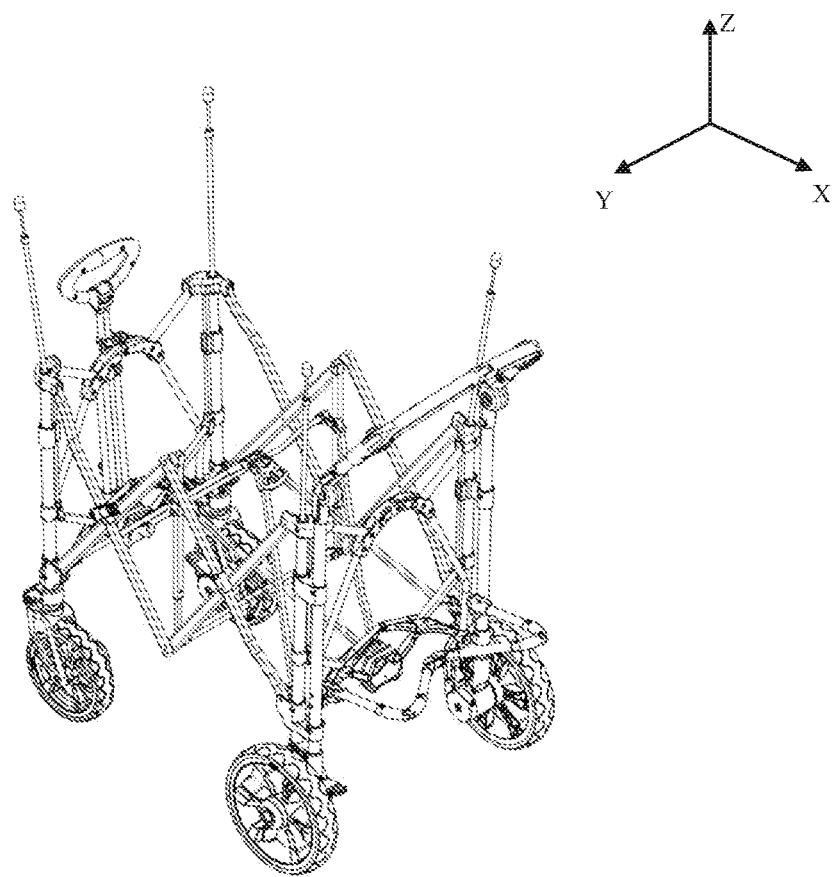
FIG. 4 is a perspective view schematically illustrating the trolley frame of the foldable trolley according to the embodiment of the present application, wherein the trolley frame is in an intermediate state between the unfolded state of FIG. 2 and the storage state of FIG. 3.

As shown by FIG. 2, the handle grip assembly 1160 is configured to include a left connection joint 1161L, a right connection joint 1161R, two middle connection joints 1162L, 1162R, and linkage rods connected respectively between the joints. Here, the linkage rods between the two middle connection joints 1162L, 1162R are configured to be hingedly coupled to each other. In the context of the present application, the term "connection joint" means that due to the existence of the connection joint, two features connected/coupled by the connection joint are rotatable relative to each other about a rotational axis defined by the connection joint. For instance, the left connection joint 1161L and the right connection joint 1161R of the handle grip assembly 1160 can be connected to the respective top ends of the handle grip rod assemblies 1115 of the rear left strut assembly 1110RL and of the rear right strut assembly 1110RR, for example fastened thereto via suitable fasteners such as screws. After being connected in place, rotational axes of the left connection joint 1161L and the right connection joint 1161R are coaxial and are parallel to the common rotational axis of the wheel assemblies 120RL, 120RR. Therefore, as the front right strut assembly 1110FR and the rear right strut assembly 1110RR are moved closer to each other in the direction of Y-axis, the handle grip assembly 1160 is able to vary from an expansion state as shown by FIG. 2 to a state as shown by FIG. 4 by the linkage rods of the handle grip assembly 1160 being folded relative to each other, finally into a shrinkage state as shown by FIG. 3. It should be understood by the ordinary person in the art that rotational positions of the connection joints themselves are relative fixed. That is to say, after the handle grip assembly 1160 is installed in place, it can be rotated to a suitable position relative to the strut assemblies as required and locked there. Then, as desired, it can be unlocked and rotated again.

The front left strut assembly 1110FL and the front right strut assembly 1110FR are configured such that they are mirror-symmetrical to each other relative to the vertical central plane of the trolley frame 110, and the rear left strut assembly 1110RL and the rear right strut assembly 1110RR are configured such that they are mirror-symmetrical to each other relative to the vertical central plane of the trolley frame 110. Therefore, after the strut assemblies are connected to the side folding assemblies, the end folding assemblies and the chassis assembly respectively, the shrinkages or expansions of the side folding, end folding, and chassis assemblies will enable the strut assemblies to move in both of the direction of X-axis and the direction of Y-axis.

It should be noticed that as shown by FIGS. 2 and 4, the respective bottom connectors 1114, 1114' of the front left strut assembly 1110FL, the rear left strut assembly 1110RL, the front right strut assembly 1110FR, and the rear right strut assembly 1110RR are stationary in the direction of Z-axis when the strut assemblies are moved in the direction of X-axis and/or the direction of Y-axis. That is to say, longitudinal positions of the respective bottom connectors 1114, 1114' on the respective strut assemblies remain unchanged when the strut assemblies are moved. Such design can ensure that the trolley frame 110 in its unfolded state is not prone to deformation because of relative motion of some underlying connectors, thus improving the robustness and durability of the trolley frame 110 in its unfolded state.

Return to FIG. 7, which schematically illustrates one of the two side folding assemblies, for example the left side folding assembly 1120L. It should be understood that the two side folding assemblies are mirror-symmetrical to each other relative to the vertical central plane of the trolley frame 110. Therefore, the contents described here for the left side folding assembly 1120L apply for the right side folding assembly 1120R.

The left side folding assembly 1120L is configured to include a middle telescopic rod assembly 1121 and two intersecting rod assemblies 1122 and 1123 both hingedly coupled to opposing ends of the middle telescopic rod assembly 1121 respectively. For instance, the intersecting rod assembly 1122 can be called as a first intersecting rod assembly 1122, and the intersecting rod assembly 1123 can be called as a second rod assembly 1123. The middle telescopic rod assembly 1121 is for example configured to include an interior rod 1121b and an exterior tube 1121a sleeved on the interior rod 1121b in such a way that the former is linearly slidable relative to the latter. Viewed in the direction of Z-axis, a top end of the exterior tube 1121a is always located above a bottom end of the interior rod 1121b. The intersecting rod assembly 1122 is configured to include a first rod 1122a and a second rod 1122b. The first rod 1122a intersects with the second rod 1122b and is hingedly coupled to the second rod 1122b at a location where they intersect with each other. In the context of the present application, the term "hingedly coupled/coupling" refers to a coupling state of two features, in which the two features coupled together forms a pivot axis about which the two features are pivotable. For instance, as a non-restrictive example only, the "hingedly coupled/coupling" can be achieved by inserting a pivot pin, forming the pivot axis, through the two features. Similarly, the intersecting rod assembly 1123 is configured to include a first rod 1123a and a second rod 1123b. The first rod 1123a intersects with the second rod 1123b and is hingedly coupled to the second rod 1123b at a location where they intersect with each other.

Figure 7:
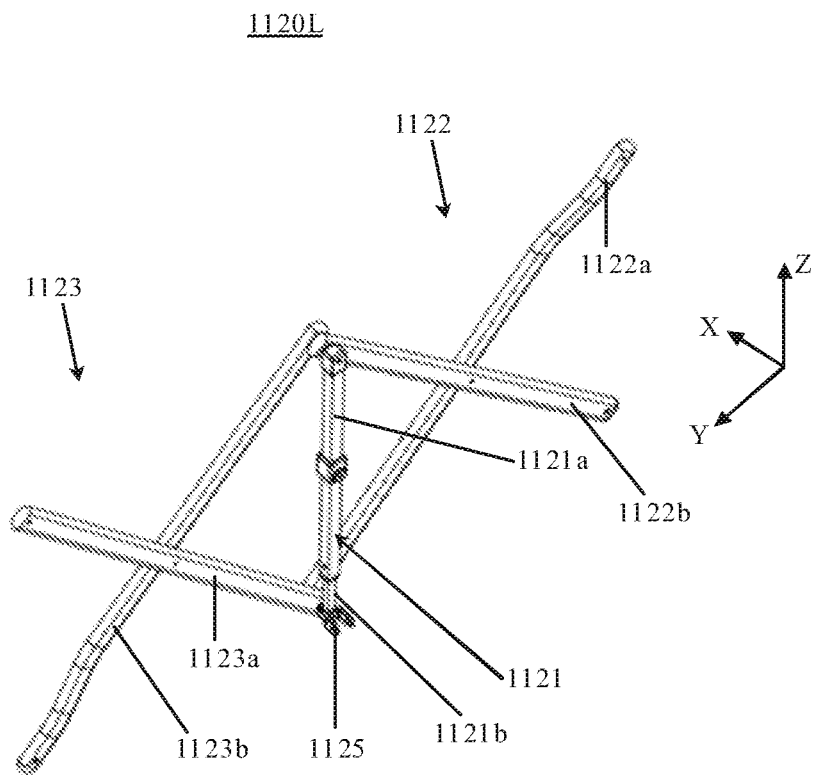
FIG. 7 is a perspective view schematically illustrating a side folding assembly of the trolley.

Each of the first rods 1122a and 1123a has two ends which are axially opposite to each other, and each of the second rods 1122b and 1123b has two ends which are axially opposite to each other. Therefore, as shown, the ends of the first rods 1122a and 1123a are hingedly coupled together to the bottom end of the interior rod 1121b of the middle telescopic rod assembly 1121, and the ends of the second rods 1122b and 1123b are hingedly coupled together to the top end of the exterior tube 1121a of the middle telescopic rod assembly 1121 such that after the left side folding assembly 1120L is fitted in place to the trolley frame 110, the pivot axes (formed by the hingedly coupled/coupling) can be parallel to or substantially parallel to the direction of Y-axis. It is understood that after the right side folding assembly 1120R is fitted in place to the trolley frame 110, the pivot axes (formed by the hingedly coupled/coupling) of the right side folding assembly can be parallel to or substantially parallel to the direction of Y-axis. Furthermore, two free ends of the intersecting rod assembly 1122 of the left side folding assembly 1120L and two free ends of the intersecting rod assembly 1123 of the left side folding assembly 1120L as shown by FIG. 7 can be hingedly coupled to the top connector 1113 and the bottom connector 1114 of the front left strut assembly 1110FL and the top connector 1113 and the bottom connector 1114' of the rear left strut assembly 1110RL. In this way, after the left side folding assembly 1120L is fitted in place to the trolley frame 110, the pivot axes are parallel to or substantially parallel to the direction of Y-axis.

Such configuration of the left side folding assembly 1120L can ensure that after it is fitted in place, as the rear left strut assembly 1110RL and the front left strut assembly 1110FL are moved closer to each other in the direction of X-axis, the first rods and the second rods of the intersecting rod assemblies 1122 and 1123 can be pivoted about their respective pivot axes such that the length of the middle telescopic rod assembly 1121 can be increased and finally the volume occupied by the left side folding assembly 1120L in the direction of X-axis can be minimized.

A slide bushing 1124 is sleeved about the middle telescopic rod assembly 1121 of the left side folding assembly 1120L, especially about the exterior tube 1121 of the middle telescopic rod assembly, such that the slide bushing 1124 is axially slidable back and forth. This slide bushing 1124 is configured for connecting a respective part of the chassis assembly 1140. Furthermore, a connection receptacle 1125 is secured at the bottom end of the interior rod 1121b of the middle telescopic rod assembly 1121. This connection receptacle 1125 is configured for connecting a respective part of the chassis assembly 1140 or a part cooperating with the chassis assembly 1140.

Figure 8:
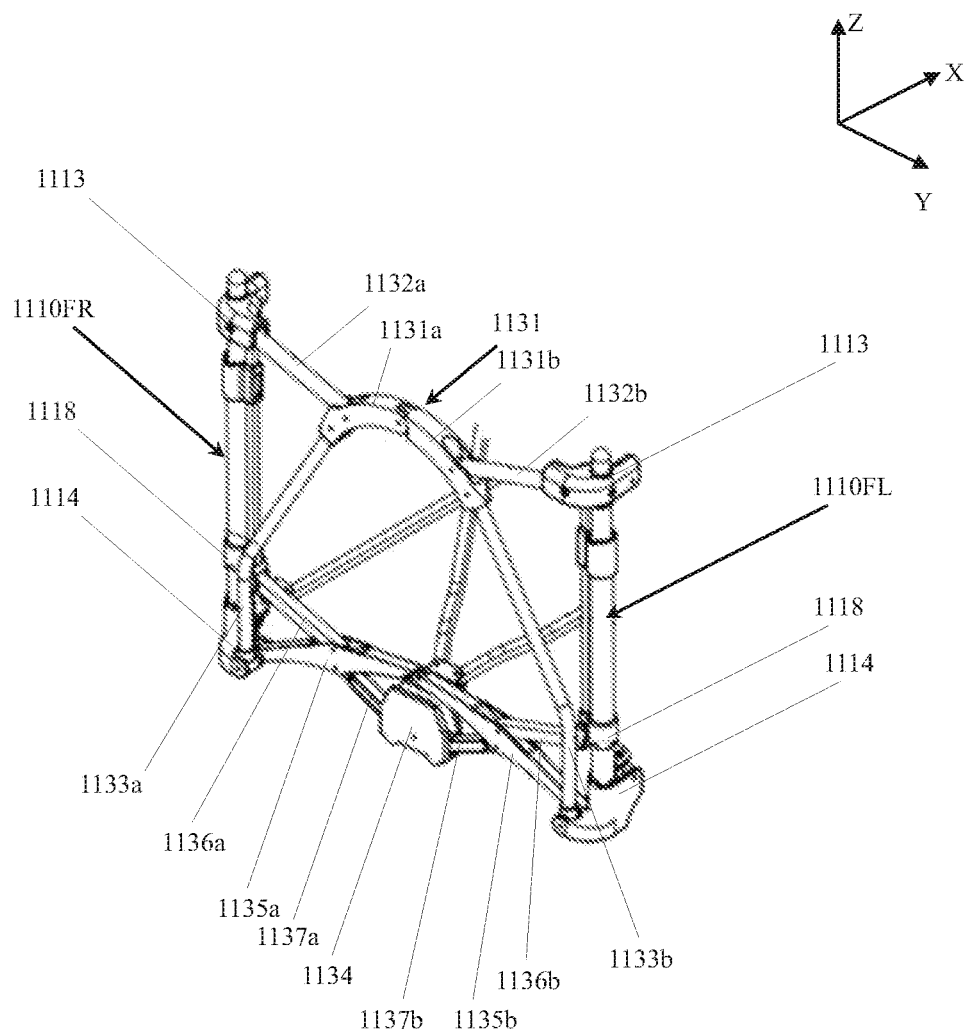
FIG. 8 is a perspective view schematically illustrating an end folding assembly, especially a front end folding assembly, of the trolley frame.
Figure 9:
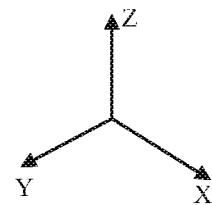
FIG. 9 is an elevation view of the end folding assembly of FIG. 8 watched in front or rear of the trolley frame.
Figure 9:
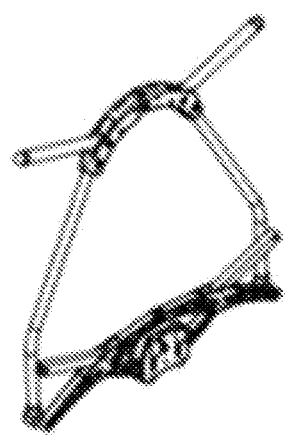

The front end folding assembly 1130F according to the present application will be explained with respect to FIGS. 8 and 9. It should be understood by the ordinary person in the art that the front end folding assembly 1130F and the rear end folding assembly 1130R are substantially similar to each other structurally. Therefore, the contents described here for the front end folding assembly 1130F also apply for the rear end folding assembly 1130R. FIG. 8 has illustrated that the front end folding assembly 1130F is coupled to the front left strut assembly 1110FL and the front right strut assembly 1110FR. The front end folding assembly 1130F is configured to include a foldable upper connection beam 1130. This foldable upper connection beam 1131 is configured to be comprised of a left connection beam section 1131b and a right connection beam section 1131a. The two connection beam sections 1131a and 1131b at their coupled ends are hinged to each other such that the upper connection beam 1131 can be folded about the hinge axis. That is to say, the two connection beam sections 1131a and 1131b are pivotable relative to each other about the hinge axis. In the meanwhile, one upper cross-rod and one slant rod are hinged at different locations of one free end of each of the two connection beam sections 1131a and 1131b. As shown by FIG. 8, one upper cross-rod 1132a and one slant rod 1132b are hinged at different locations of the free end of the connection beam section 1131a respectively, and one upper cross-rod 1132b and one slant rod 1133b are hinged at different locations of the free end of the connection beam section 1131b respectively. Viewed in the ZY plane, these cross-rods, slant rods and connection beam sections are distributed in a mirror-symmetrical manner Ends of the upper cross-rod 1132a and the slant rod 1133a opposing the ends hinged to the connection beam 1131 are hingedly coupled to the top connector 1113 and the bottom connector 1114 of the front right strut assembly 1110FR respectively. Similarly, end of the upper cross-rod 1132b and the slant rod 1133b opposing the ends hinged to the connection beam 1131 are hingedly coupled to the top connector 1113 and the bottom connector 1114 of the front left strut assembly 1110FL respectively. Each of the cross-rods 1132a and 1132b has a length which is substantially less than a length of the respective slant rod 1133a or 1133b. Furthermore, each of the connection beam sections 1131a and 1131b is in the form of an arc, such that the upper connection beam 1131 of the front end folding assembly 1130F in its unfolded state is also in the form of an arc.

Furthermore, the front end folding assembly 1130F is additionally configured to include a carrier 1134 located below the upper connection beam 1131. Furthermore, the front end folding assembly 1130F is additionally configured to include two bottom support beams 1135a and 1135b, i.e. a first bottom support beam 1135a and a second bottom support beam 1135b. The bottom support beam 1135a has one end hingedly coupled to the bottom connector 1114 of the front right strut assembly 1110FR, and the bottom support beam 1135b has one end hingedly coupled to the bottom connector 1114 of the front left strut assembly 1110FL. Further, the two bottom support beams 1135a and 1135b are hinged to each other with a hinge axis being located between the upper connection beam 1131 and the carrier 1134 in the direction of Z-axis. In the meanwhile, one lower cross-rod 1136a is coupled between the bottom support beam 1135a and the slip ring 1118 of the front right strut assembly 1110FR, and one lower cross-rod 1136b is coupled between the bottom support beam 1135b and the slip ring 1118 of the front left strut assembly 1110FL. For instance, the lower cross-rod 1136a is hingedly coupled to the bottom support beam 1135a at one end and hingedly coupled to the slip ring 1118 of the front right strut assembly 1110FR at the other opposing end; and the lower cross-rod 1136b is hingedly coupled to the bottom support beam 1135b at one end and hingedly coupled to the slip ring 1118 of the front left strut assembly 1110FL at the other opposing end. In the meanwhile, one bottom connection beam 1137a is coupled between the carrier 1134 and the bottom support beam 1135a, and one bottom connection beam 1137b is coupled between the carrier 1134 and the bottom support beam 1135b. For instance, the bottom beam 1137a is hingedly coupled to the carrier 1134 at one end and hingedly coupled to the bottom support beam 1135a at the other opposing end; and the bottom beam 1137b is hingedly coupled to the carrier 1134 at one end and hingedly coupled to the bottom support beam 1135b at the other opposing end. It should be noted that for one and the same bottom support beam, the respective bottom cross-rod and the respective bottom connection beam are hinged at separated locations. Take the bottom support beam 1135a for example. It can be seen that the location where the bottom cross-rod 1136a is hinged to the respective bottom support beam 1135a is separated from the location where the bottom connection beam 1137a is hinged to the respective bottom support beam 1135a. Therefore, viewed in the ZY plane, these top cross-rods, slant rods, connection beam sections, bottom cross-rods, bottom connection beams and carrier of the front end folding assembly 1130F are distributed in a mirror-symmetrical manner.

Return to FIG. 9. It can be seen that the illustrated rod connection configuration design of the front end folding assembly 1130F ensures that there exist several triangle connection sub-structures, which are symmetrically distributed, between two strut assemblies. These triangle connection sub-structures can guarantee the structural firmness of the front end folding assembly 1130F in its unfolded state. Especially, the slant rods 1133a and 1133b of the front end folding assembly 1130F have ends which are coupled to the strut assemblies 1110FL and 1110FR respectively and whose positions in the direction of Z-axis remain unchanged no matter whether the front end folding assembly is in its unfolded state, folded state, or an intermediate transitional state between the two, thus guaranteeing the improved structural firmness of the front end folding assembly 1130F.

Further as shown by FIG. 2, a pull rod assembly 1170 is coupled to the carrier 1134 of the front end folding assembly 1130F. For instance, the pull rod assembly 1170 has a bottom end hingedly coupled to the carrier 1134 of the front end folding assembly 1130F such that the pull rod assembly 1170 is pivotable about a pivot axis parallel to or substantially parallel to Y-axis. An opposite end of the pull rod assembly 1170 is configured to be gripped by a hand of the user, such that the foldable trolley 100 can be pulled to move. Furthermore, the upper connection beam 1131 of the front end folding assembly 1130F, especially one of the left and right connection beam sections 1131a and 1131b is provided with a holder 1180 for holding the pull rod assembly 1170. In this way, the pull rod assembly 1170 is selectively engageable with the holder so as to be secured relative to the frame 110.

Figure 11:
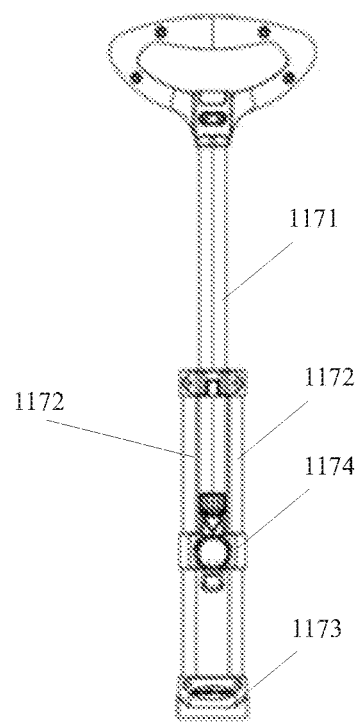
FIG. 11 is an elevation view schematically illustrating a pull rod assembly according to an embodiment of the present application.

FIG. 11 schematically illustrates the pull rod assembly 1170 according to one embodiment of the present application. This pull rod assembly 1170 is configured to include two outer rods 1172 spaced from each other and an inner double-rod piece 1171 installed between the outer rods 1172 and linearly slidable relative to the outer rods 1172. The inner double-rod piece 1171 is formed by two rods parallel to each other and secured firmly against each other. The two outer rods 1172 are secured with a bracket at both ends thereof. A lower support of the bracket is configured as a lower end of the bracket used to be secured with the front end folding assembly 1130F, i.e. a hinge seat 1173. Furthermore, an end of the inner double-rod piece 1171 inserting between the two outer rods 1172 is provided with a guide 1174, and the other opposite end of the inner double-rod piece is configured to form a handle of the pull rod assembly 1170 which can be gripped by one hand of the user. The double-rod piece 1171 is configured to pass through the bracket secured at the upper ends of the two outer rods 1172 and be guided by the same. The pull rod assembly 1170 is designed in such a way that it is guaranteed that the length of the pull rod assembly 1170 can be varied as desired and the strength to bear a force is improved. Furthermore, the guide 1174 is provided with a lock feature which is selectively lockable together with the hinge seat 1173 when they approach or are in contact with each other. When the length of the pull rod assembly 1170 is varied into a minimized state, the inner double-rod piece 1171 is able to project outwards between the two outer rods 1172 in its lengthwise direction.

Figure 12:
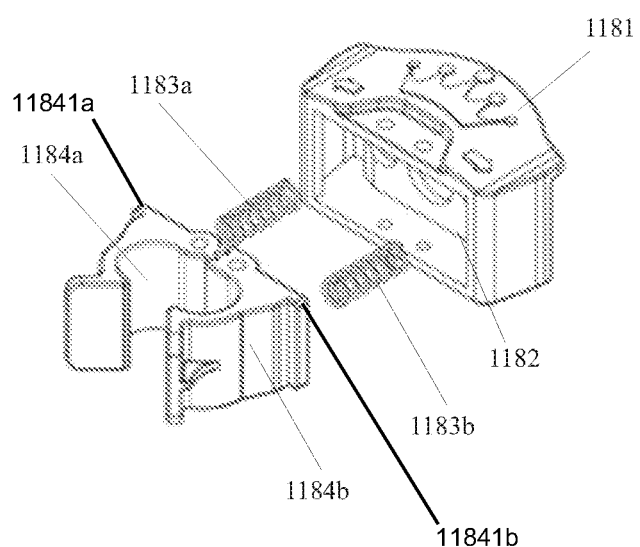
FIG. 12 is an exploded and perspective view schematically illustrating a holder according to an embodiment of the present application, which holder is for example installable onto the front end folding assembly.
Figure 13:
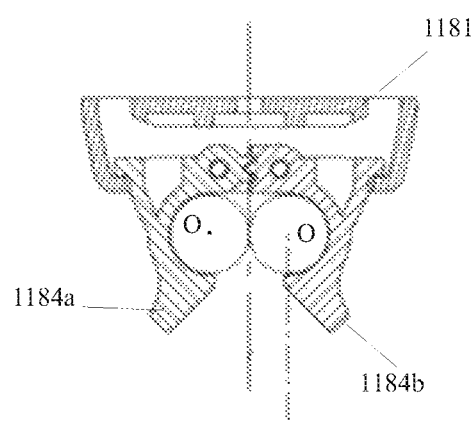
FIG. 13 is a cross-sectional view schematically illustrating the holder of FIG. 12.
Figure 14:
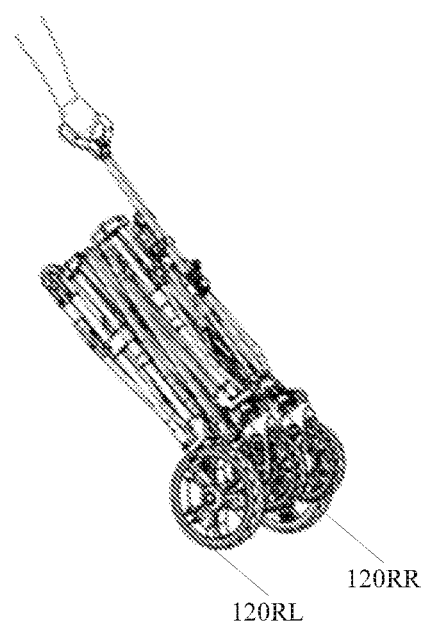
FIG. 14 is a perspective view schematically illustrating how the trolley frame in its storage state is manually pulled to move.

FIG. 12 is an exploded and perspective view schematically illustrating the holder 1180. The holder 1180 is configured to include a seat 1181. The seat is configured to be secured, via a fastener such as a screw, on the upper connection beam 1131 of the front end folding assembly 1130F, especially one of the left connection beam section 1131a and the right connection beam section 1131b thereof. A recessed cavity 1182 is formed in the seat 1181 to receive spiral springs 1183a, 1183b and clips 1184a, 1184b as mentioned below. The clips 1184a, 1184b are configured to be pivotally installed in the recessed cavity and pivot axes of them are separated from each other. Furthermore, the two spiral springs 1183a, 1183b are arranged in the recessed cavity 1182 so as to exert a force between the seat and the clips 1184a, 1184b to pivot the clips 1184a, 1184b. When the seat 1181 is installed in place and the trolley frame 110 is in the unfolded state, the pivot axes of the clips 1184a, 1184b are parallel to or substantially parallel to the direction of Z-axis. Each of the clips 1184a, 1184b is formed with a plurality of teeth adjacent to its respective pivot axis such that the teeth of the clips are engageable with each other between the pivot axes. Moreover, each of the clips 1184a, 1184b is formed with a projection 11841a or 11841b opposing their respective teeth. In this way, the projections 11841a and 11841b can be blocked correspondingly by peripheral edges of the recessed cavity 1182 to prevent the clips from escaping. Each of the clips 1184a, 1184b is formed with a partially cylinderical inner surface. The partially cylinderical inner surfaces of the clips have their own central axes. As the clips 1184a, 1184b are pivoted, a vertical distance between the central axes of the partially cylinderical inner surfaces can be increased or decreased. When it is desired to install the inner double-rod piece 1171, the two clips 1184a, 1184b can be pivoted outwards about their own pivot axes respectively such that the vertical distance between the central axes of the partially cylinderical inner surfaces can be maximized, which facilitates inserting the inner double-rod piece 1171 between the clips 1184a, 1184b. Thereafter, the clips 1184a, 1184b can be pivoted inwards about their own pivot axes respectively. In the meanwhile, the partially cylinderical inner surfaces of the clips will contact the respective rods of the inner double-rod piece 1171 and the vertical distance between the central axes of the partially cylinderical inner surfaces can be minimized. Then, the vertical distance between the central axes of the partially cylinderical inner surfaces is slightly less than a vertical distance between the respective rods of the inner double-rod piece 1171, such that engagement of the respective teeth can hold the inner double-rod piece 1171 in place relative to the holder 1180. If desired, the two clips 1174a, 1184b can be pivoted outwards again about their own pivot axes respectively such that the vertical distance between the central axes of the partially cylinderical inner surfaces can be maximized again so as to remove the inner double-rod piece 1171.

The holder 1180 is installed on the front end folding assembly 1130F at a location such that the holder can be exposed when the trolley frame 110 is in the folded state. In this way, the pull rod assembly 1170 can be secured to the holder 1180 by its inner double-rod piece 1171, such that the user can pull the trolley frame 110, which is in the folded state, by his/her hand to move the foldable trolley 100 conveniently. In this case, the wheel assemblies 120RL, 120RR can be as wheel assemblies in contact with the ground, and the wheel assemblies 120FL, 120FR cannot be in contact with the ground. This can result in improved mobility of the foldable trolley 100 in its folded state.

Figure 10:
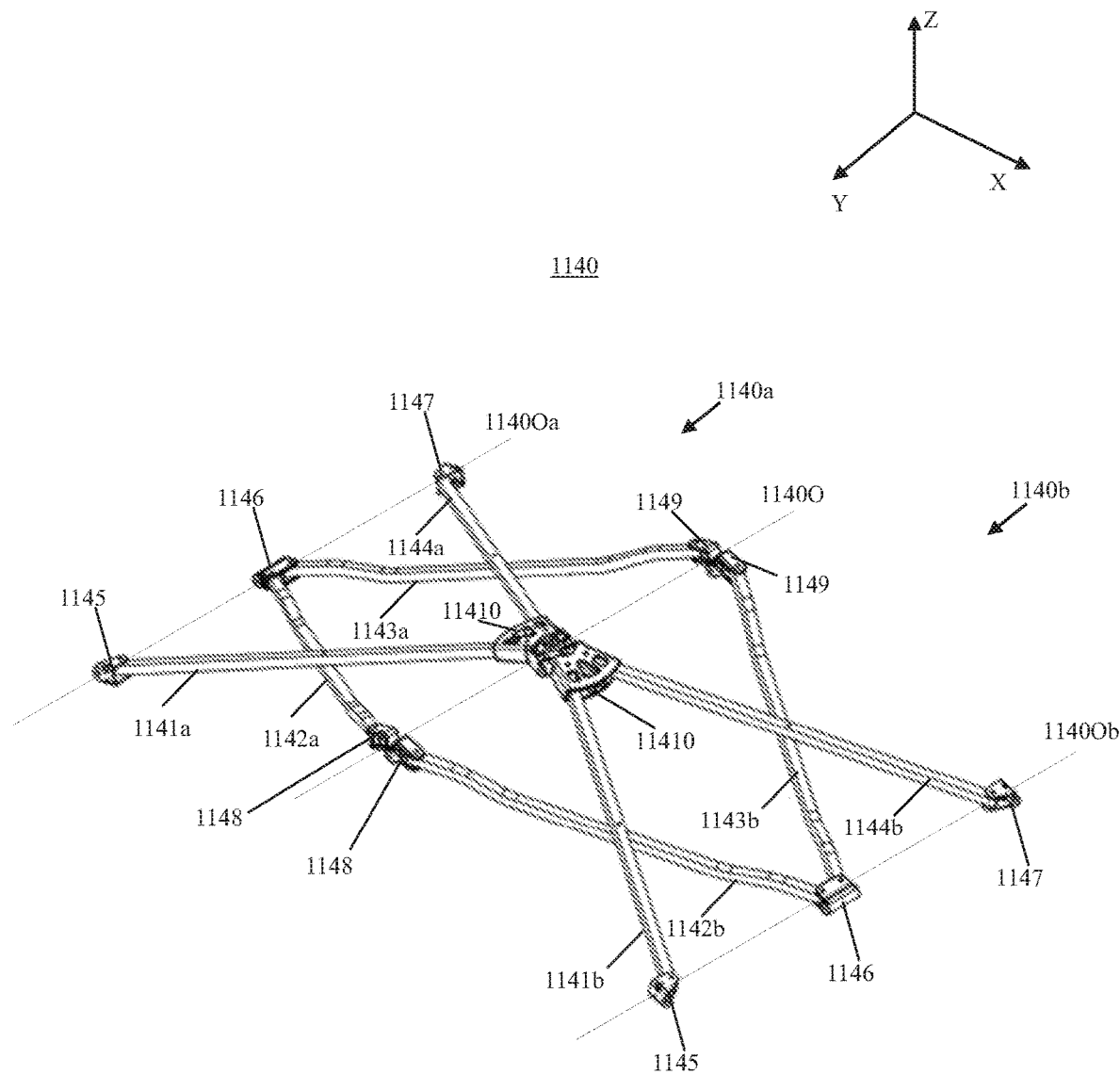
FIG. 10 is a perspective view schematically illustrating a chassis assembly of the trolley frame.

An example of the chassis assembly 1140 according to the present application will be introduced with respect to FIG. 10 below. As shown, the chassis assembly 1140 is configured to include a first chassis sub-assembly 1140a and a second chassis sub-assembly 1140b which are hingedly coupled to each other. Moreover, the first chassis sub-assembly 1140a is hingedly coupled to the strut assemblies 1110FL, 1110FR and the front end folding assembly 1130F, and the second chassis sub-assembly 1140b is hingedly coupled to the strut assemblies 1110RL, 1110RR and the rear end folding assembly 1130R. Additionally, the chassis assembly 1140 is configured to cooperate with the side folding assemblies 1120L, 11220R. The first chassis sub-assembly 1140a is hingedly coupled to the second chassis sub-assembly 1140b in such a way that a pivot axis 11400 is formed therebetween and thus the first chassis sub-assembly 1140a is pivotable relative to the second chassis sub-assembly 1140b about the pivot axis 11400. Additionally, the first chassis sub-assembly 1140a is hingedly coupled to the strut assemblies 1110FL, 1110FR and the front end folding assembly 1130F in such a way that a pivot axis 11400a is formed therebetween and thus the first chassis sub-assembly 1140a is pivotable relative to the strut assemblies 1110FL, 1110FR and the front end folding assembly 1130F about the pivot axis 11400a. Additionally, the second chassis sub-assembly 1140b is hingedly coupled to the strut assemblies 1110RL, 1110RR and the rear end folding assembly 1130R in such a way that a pivot axis 11400b is formed therebetween and thus the second chassis sub-assembly 1140b is pivotable relative to the strut assemblies 1110RL, 1110RR and the rear end folding assembly 1130R about the pivot axis 11400b. As the trolley frame 110 is in its unfolded state, these pivot axes 11400, 11400a, 11400b are parallel to or substantially parallel to each other and parallel to or substantially parallel to the XY plane.

The first chassis sub-assembly 1140a is configured to include a first rod piece 1141a, a second rod piece 1142a, a third rod piece 1143a, and a fourth rod piece 1144a, wherein the first rod piece 1141a intersects with the second rod piece 1142a and is hingedly coupled to the second rod piece 1142a at an intersecting location therebetween, and wherein the third rod piece 1143a intersects with the fourth rod piece 1144a and is hingedly coupled to the fourth rod piece 1144a at an intersecting location therebetween. The first rod piece 1141a has a first end configured to be hingedly coupled to the bottom connector 1114 of the front left strut assembly 1110FL. For instance, a first connecting part 1145 is installed at the first end of the first rod piece 1141a to form the hinged coupling. This first connecting part 1145 is pivotally connected to the bottom connector 1114 of the front left strut assembly 1110FL. In the meanwhile, the first end of the first rod piece 1141a itself is independently pivotable relative to the first connecting part 1145.

The second rod piece 1142a has a first end and the third rod piece 1143a has a first end, which first ends both are pivotally connected to a second connecting part 1146 such that their connecting locations with the second connecting part are separated from each other. Moreover, each of the second and third rod pieces 1142a and 1143a is pivotable relative to the second connecting part 1146. In the meanwhile, the second connecting part 1146 is pivotally connected to the carrier 1134 of the front end folding assembly 1130F. The fourth rod piece 1144a has a first end which is pivotally connected to a third connecting part 1147. Moreover, the first end of the fourth rod piece 1144a is pivotally connected to the bottom connector 1114 of the front right strut assembly 1110FR using the third connecting part 1147.

That is to say, the first connecting part 1145, the second connecting part 1146 and the third connecting part 1147 together define the pivot axis 11400*a* about which the first chassis sub-assembly 1140*a* is pivotable relative to the strut assemblies 1110FL, 1110FR and the front end folding assembly 1130F.

Similarly, a first rod piece 1141*b*, a second rod piece 1142*b*, a third rod piece 1143*b*, and a fourth rod piece 1144*b* of the second chassis sub-assembly 1140*b* are respectively equipped with a first connecting part 1145, a second connecting part 1146, and a third connecting part 1147 at their respective first ends in a manner corresponding to the rod pieces 1141*a*-1144*a*. Similar to the first chassis sub-assembly 1140*a*, these connecting parts are pivotally connected to the strut assemblies 1110RL, 1110RR and the rear end folding assembly 1130R in such a way that the first connecting part 1145, the second connecting part 1146 and the third connecting part 1147 together define the pivot axis 11400*b* about which the second chassis sub-assembly 1140*b* is pivotable relative to the strut assemblies 1110RL, 1110RR and the rear end folding assembly 1130R.

Furthermore, it is understood by the ordinary person in the art that as those connecting parts are respectively connected to the respective strut assemblies and the respective end folding assemblies, those connecting parts can be moved towards each other or away from each other with the shrinkage or expansion of the respective assemblies.

For the first chassis sub-assembly 1140*a*, an opposing second end of the first rod piece 1141*a* and an opposing second end of the fourth rod piece 1144*a* are both pivotally connected to an intermediate connecting part 11410. An opposing second end of the second rod piece 1142*a* is hingedly coupled to a fourth connecting part 1148, and an opposing second end of the third rod piece 1143*a* is hingedly coupled to a fifth connecting part 1149. Similarly, an opposing second end of the first rod piece 1141*b* and an opposing second end of the fourth rod piece 1144*b* of the second chassis sub-assembly 1140*b* are both hingedly coupled to an intermediate connecting part 11410, an opposing second end of the second rod piece 1142*b* is hingedly coupled to a fourth connecting part 1148, and an opposing second end of the third rod piece 1143*b* is hingedly coupled to a fifth connecting part 1149. The fourth connecting parts 1148, the intermediate connecting parts 11410, and the fifth connecting parts 1149 of the first chassis sub-assembly 1140*a* and the second chassis sub-assembly 1140*b* are hingedly coupled to each other respectively so as to define the pivot axis 11400 about which the first chassis sub-assembly 1140*a* is pivotable relative the second chassis sub-assembly 1140*b*. It should be understood by the ordinary person in the art that the pivot axes between those rod pieces connected by the respective connecting parts 1145, 1146, 1147, 1148, 1149 and 11410 mentioned above and the respective connecting parts are non-coplanar to the pivot axes between those connecting parts and the respective assemblies. That is to say, relevant pivoting movements can be independent from each other.

Figure 15A:
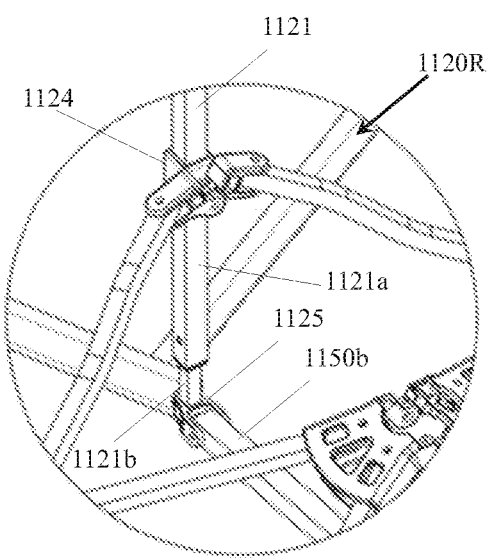
FIG. 15A is an enlarged view schematically illustrating a region where the side folding assembly cooperates with the chassis assembly, wherein the trolley frame is in the intermediate state.

The fourth connecting parts 1148 hingedly coupled to each other and the fifth connecting parts 1149 hingedly coupled to each other, whose positions are opposite to each other, of the chassis assembly 1140 are operatively coupled to the respective slide bushings 1124 of the side folding assemblies 1120L, 1120R. Take the side folding assembly 1120R for example and refer to FIGS. 15A and 15B, an operative connection between the four connecting part 1148 and the fifth connecting part 1149 of the chassis assembly 1140 and the slide bushing 1124 will be explained below. It should be understood by the ordinary person in the art that the same contents apply for the side folding assembly 1120L. A hinged axis between the fourth connecting part 1148 and the fifth connecting part 1149 hingedly coupled to each other is stationary relative to the slide bushing 1124 which is slideably provided on the middle telescopic rod assembly 1121, especially on its exterior tube 1121*a*. Therefore, the hinged axis between the fourth connecting part 1148 and the fifth connecting part 1149 hingedly coupled to each other is movable along with the slide bushing 1124. That is to say, the hinged axis is constrained to be axially and linearly movable along the middle telescopic rod assembly 1121 of the side folding assembly 1120R only.

Figure 15B:
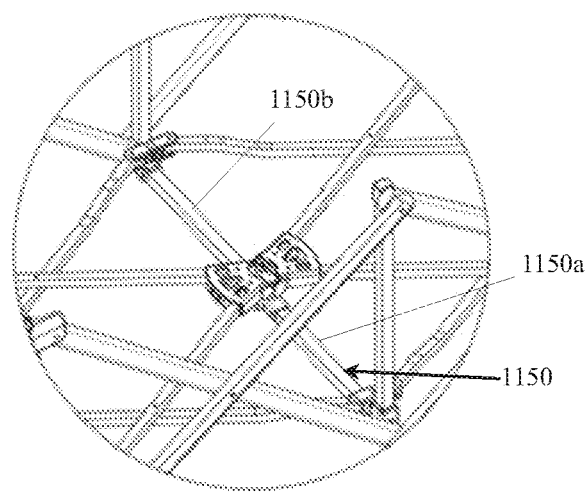
FIG. 15B is an enlarged view schematically illustrating the region where the side folding assembly cooperates with the chassis assembly, wherein the trolley frame is in the unfolded state.

Further, as shown by FIG. 15B, an auxiliary cross-bar support assembly 1150 is provided between the two folding assemblies 1120L, 1120R. Moreover, as shown by FIG. 5, this auxiliary cross-bar support assembly 1150 is configured to include a first bar 1150*a* and a second bar 1150*b* whose lengths are equal to each other. The first bar 1150*a* and the second bar 1150*b* are configured to be hingedly coupled to each other at their contacting first ends by a suitable connecting part. Additionally, the first bar 1150*a* of the auxiliary cross-bar support assembly 1150 at its opposing second end is hingedly coupled to the connection receptacle 1125 of the folding assembly 1120L, and the second bar 1150*b* of the auxiliary cross-bar support assembly 1150 at its opposing second end is hingedly coupled to the connection receptacle 1125 of the folding assembly 1120R. The auxiliary cross-bar support assembly 1150 is configured such that when the trolley frame 110 is in its unfolded state, the auxiliary cross-bar support assembly 1150 is located below the chassis assembly 1140. Therefore, when the trolley frame 110 is in the unfolded sate, the chassis assembly 1140 is able to be supported on the auxiliary cross-bar support assembly 1150, especially on the suitable connecting part of the auxiliary cross-bar support assembly, by its intermediate connecting part 11410. Furthermore, when the trolley frame 110 is in the unfolded state, the chassis assembly 1140 is also able to be supported on the auxiliary cross-bar support assembly 1150 by its hingedly coupled fourth connecting part 1148 and fifth connecting part 1149 as the interior rods 1121*b* of the folding assemblies 1120L, 1120R are retracted into the respective exterior rods 1121*a* with the connection receptacles 1125 being exposed only. Such design can ensure that the chassis assembly 1140 can support more weight and thus the overall carrying capacity of the trolley frame 110 is enhanced.

As shown by FIG. 2, the trolley frame 110 is additionally configured to include an auxiliary extensible bracket 1190. This auxiliary extensible bracket 1190 can be configured in a manner similar to the handle grip assembly 1160. That is, the auxiliary extensible bracket 1190 can be comprised of a plurality of rod pieces which are hingedly coupled to each other, such that a projected length of the auxiliary extensible bracket 1190 in the XY plane can be shortened or prolonged as desired. The auxiliary extensible bracket 1190 at its both ends can be hingedly coupled to the handle grip rod assemblies 1115 of the strut assemblies 1110RL, 1110RR respectively. In this way, when the trolley frame 1110 is in the unfolded state, the auxiliary extensible bracket 1190 is pivotable relative to the strut assemblies 1110RL, 1110RR. Therefore, when a person is sitting in the trolley frame 110 in its unfolded state, the auxiliary extensible bracket 1190 can be selectively pivoted into a substantially horizontal position at which legs of the person can be readily supported by the bracket, enabling the person, who is sitting in the trolley frame, to feel more comfortable. It should be noted that in an alternative embodiment, the foldable upper connection beam 1131 of the front end folding assembly 1130F can be provided with a lock mechanism which is configured to cooperate with a safety belt configured to be worn by the person sitting in the foldable trolley. For example, the lock mechanism can be a lock button configured to receive the safety belt.

The cloth assembly 130 may be comprised of several awning sheets. For example, Velcro fasteners can be provided in the cloth assembly at desire locations such that the cloth assembly can be readily attached to the respective rod pieces of the assemblies. For instance, after the trolley frame 110 is assembled in place, the cloth assembly 130 can be attached to the respective assemblies as already mentioned so as to constitute the foldable trolley 100 as shown by FIG. 1. When it is required to be folded for storage, the trolley frame 110 according to the present application can be transferred from the unfolded state as shown by FIG. 2, through the state as shown by FIG. 4, finally into the storage state as shown by FIG. 3. During the transferring process, the assemblies will be folded and be moved relatively towards each other in various directions so as to ensure that the trolley frame 110 in its storage state will occupy a minimized volume. Furthermore, in the unfolded state, the specific design of the assemblies constituting the trolley frame 110 will enable the entire trolley frame to be more robust.

Although some specific embodiments of the present application are described in details here, they are given for illustrative purposes only and cannot be deemed to constrain the scope of the present application in any way. Furthermore, it should be understood by the ordinary person in the art that the embodiments described here can be arbitrarily combined with each other. Without departing from the spirit and scope of the present application, various alternations, replacements and modifications can be thought out.

What is claimed is:

1. A foldable trolley having a trolley frame, the trolley frame comprising:
   a front left strut assembly, a front right strut assembly, a rear left strut assembly, and a rear right strut assembly, each of which assemblies is provided with a top connector and a bottom connector movable axially relative to each other;
   a front end folding assembly configured to be coupled respectively to the top connectors and the bottom connectors of the front left strut assembly and the front right strut assembly and to be foldable in a widthwise direction of the trolley frame;
   a rear end folding assembly configured to be coupled respectively to the top connectors and the bottom connectors of the rear left strut assembly and the rear right strut assembly and to be foldable in the widthwise direction of the trolley frame;
   a left side folding assembly configured to be coupled respectively to the top connectors and the bottom connectors of the front left strut assembly and the rear left strut assembly and to be foldable in a lengthwise direction of the trolley frame;
   a right side folding assembly configured to be coupled respectively to the top connectors and the bottom connectors of the front right strut assembly and the rear right strut assembly and to be foldable in the lengthwise direction of the trolley frame; and
   a chassis assembly configured to be coupled respectively to the bottom connectors of the front left strut assembly, the rear left strut assembly, the rear left strut assembly and the rear right strut assembly and respectively to the left side folding assembly and the right side folding assembly, and configured to be foldable both in the widthwise and lengthwise directions of the trolley frame,
   wherein each of the front left strut assembly, the rear left strut assembly, the rear left strut assembly and the rear right strut assembly comprises a telescopic rod assembly configured to include an interior rod and a hollow exterior rod in which the interior rod is axially slidable, the respective top connector is secured on an upper end of the interior rod and the respective bottom connector is secured on a lower end of the exterior rod, and wherein in the process that the foldable trolley is being folded for storage, the bottom connectors are axially immovable relative to the respective strut assemblies; and
   wherein the front end folding assembly comprises:
      a foldable upper connection beam comprised of a left connection beam section and a right connection beam section hingedly coupled to each other, wherein the left connection beam is hingedly coupled with an upper cross-rod and a slant rod in such a way that the upper cross-rod is also hingedly coupled to the top connector of the front left strut assembly and the slant rod is also hingedly coupled to the bottom connector of the front left strut assembly, and the right connection beam is hingedly coupled with an upper cross-rod and a slant rod in such a way that the upper cross-rod is also hingedly coupled to the top connector of the front right strut assembly and the slant rod is also hingedly coupled to the bottom connector of the front right strut assembly;
   a carrier located below the upper connection beam;
      a first bottom support beam and a second bottom support beam, wherein the first bottom support beam is configured to include a first end and the second bottom support beam is configured to include a first end, both of which first ends are hingedly coupled to each other between the upper connection beam and the carrier, the first bottom support beam is configured to include a second end opposing its first end and the second support beam is configured to include a second end opposing its first end, the second end of the first bottom support beam is hingedly coupled to the bottom connector of the front right strut assembly and the second end of the second bottom support beam is hingedly coupled to the bottom connector of the front left strut assembly;
      a first bottom connection beam and a second bottom connection beam, wherein the first bottom connection beam is hingedly coupled between the first bottom support beam and the carrier and the second bottom connection beam is hingedly coupled between the second bottom support beam and the carrier; and
      a first lower cross-rod and a second lower cross-rod, wherein the first lower cross-rod is hingedly coupled between the first bottom support beam and a slip ring of the front right strut assembly which is linearly slidable relative to its exterior rod, and the second lower cross-rod is hingedly coupled between the second bottom support beam and a slip ring of the front left strut assembly which is linearly slidable relative to its exterior rod.

2. The foldable trolley as recited in claim 1, wherein the rear end folding assembly comprises:

a foldable upper connection beam comprised of a left connection beam section and a right connection beam section hingedly coupled to each other, wherein the left connection beam is hingedly coupled with an upper cross-rod and a slant rod in such a way that the upper cross-rod is also hingedly coupled to the top connector of the rear left strut assembly and the slant rod is also hingedly coupled to the bottom connector of the rear left strut assembly, and the right connection beam is hingedly coupled with an upper cross-rod and a slant rod in such a way that the upper cross-rod is also hingedly coupled to the top connector of the rear right strut assembly and the slant rod is also hingedly coupled to the bottom connector of the rear right strut assembly;

a carrier located below the upper connection beam;

a first bottom support beam and a second bottom support beam, wherein the first bottom support beam is configured to include a first end and the second bottom support beam is configured to include a first end, both of which first ends are hingedly coupled to each other between the upper connection beam and the carrier, the first bottom support beam is configured to include a second end opposing its first end and the second support beam is configured to include a second end opposing its first end, the second end of the first bottom support beam is hingedly coupled to the bottom connector of the rear right strut assembly and the second end of the second bottom support beam is hingedly coupled to the bottom connector of the rear left strut assembly;

a first bottom connection beam and a second bottom connection beam, wherein the first bottom connection beam is hingedly coupled between the first bottom support beam and the carrier and the second bottom connection beam is hingedly coupled between the second bottom support beam and the carrier; and a first lower cross-rod and a second lower cross-rod, wherein the first lower cross-rod is hingedly coupled between the first bottom support beam and a slip ring of the rear right strut assembly which is linearly slidable relative to its exterior rod, and the second lower cross-rod is hingedly coupled between the second bottom support beam and a slip ring of the rear left strut assembly which is linearly slidable relative to its exterior rod.

3. The foldable trolley as recited in claim 2, wherein the left side folding assembly is configured to include a middle telescopic rod assembly and a first intersecting rod assembly and a second intersecting rod assembly, which first intersecting rod assembly and which second intersecting rod assembly are hingedly coupled respectively to opposing ends of the middle telescopic rod assembly, the middle telescopic rod assembly is configured to include an interior rod and an exterior tube configured to be sleeved on the interior rod in such a way that they are linearly slidable relative to each other, wherein the inner rod has a bottom end defining the end to which the first intersecting rod assembly and the second intersecting rod assembly are hingedly coupled, and the exterior tube has a top end defining the other end to which the first intersecting rod assembly and the second intersecting rod assembly are hingedly coupled;

the first intersecting rod assembly is configured to include a first rod and a second rod intersecting with each other and hingedly coupled to each other at an intersecting location therebetween, wherein the first rod of the first intersecting rod assembly is configured to include a first end hingedly coupled to the top connector of the front left strut assembly and an opposing second end hingedly coupled to the middle telescopic rod assembly, and the second rod of the first intersecting rod assembly is configured to include a first end hingedly coupled to the bottom connector of the front left strut assembly and an opposing second end hingedly coupled to the middle telescopic rod assembly;

the second intersecting rod assembly is configured to include a first rod and a second rod intersecting with each other and hingedly coupled to each other at an intersecting location therebetween, wherein the first rod of the second intersecting rod assembly is configured to include a first end hingedly coupled to the top connector of the rear left strut assembly and an opposing second end hingedly coupled to the middle telescopic rod assembly, and the second rod of the second intersecting rod assembly is configured to include a first end hingedly coupled to the bottom connector of the rear left strut assembly and an opposing second end hingedly coupled to the middle telescopic rod assembly.

4. The foldable trolley as recited in claim 3, wherein the right side folding assembly is configured to include a middle telescopic rod assembly and a first intersecting rod assembly and a second intersecting rod assembly, which first intersecting rod assembly and which second intersecting rod assembly are hingedly coupled respectively to opposing ends of the middle telescopic rod assembly, the middle telescopic rod assembly of the right side folding assembly is configured to include an interior rod and an exterior tube configured to be sleeved on the interior rod in such a way that they are linearly slidable relative to each other, wherein the inner rod has a bottom end defining the end to which the first intersecting rod assembly of the right side folding assembly and the second intersecting rod assembly of the right side folding assembly are hingedly coupled, and the exterior tube has a top end defining the other end to which the first intersecting rod assembly of the right side folding assembly and the second intersecting rod assembly of the right side folding assembly are hingedly coupled;

the first intersecting rod assembly of the right side folding assembly is configured to include a first rod and a second rod intersecting with each other and hingedly coupled to each other at an intersecting location therebetween, wherein the first rod of the first intersecting rod assembly is configured to include a first end hingedly coupled to the top connector of the front right strut assembly and an opposing second end hingedly coupled to the middle telescopic rod assembly, and the second rod of the first intersecting rod assembly of the right side folding assembly is configured to include a first end hingedly coupled to the bottom connector of the front right strut assembly and an opposing second end hingedly coupled to the middle telescopic rod assembly;

the second intersecting rod assembly of the right side folding assembly is configured to include a first rod and a second rod intersecting with each other and hingedly coupled to each other at an intersecting location therebetween, wherein the first rod of the second intersecting rod assembly is configured to include a first end hingedly coupled to the top connector of the rear right strut assembly and an opposing second end hingedly coupled to the middle telescopic rod assembly, and the second rod of the second intersecting rod assembly of the right side folding assembly is configured to include a first end hingedly coupled to the bottom connector of the rear right strut assembly and an opposing second end hingedly coupled to the middle telescopic rod assembly.

5. A foldable trolley having a trolley frame, the trolley frame comprising:
   a front left strut assembly, a front right strut assembly, a rear left strut assembly, and a rear right strut assembly, each of which assemblies is provided with a top connector and a bottom connector movable axially relative to each other;
   a front end folding assembly configured to be coupled respectively to the top connectors and the bottom connectors of the front left strut assembly and the front right strut assembly and to be foldable in a widthwise direction of the trolley frame;
   a rear end folding assembly configured to be coupled respectively to the top connectors and the bottom connectors of the rear left strut assembly and the rear right strut assembly and to be foldable in the widthwise direction of the trolley frame;
   a left side folding assembly configured to be coupled respectively to the top connectors and the bottom connectors of the front left strut assembly and the rear left strut assembly and to be foldable in a lengthwise direction of the trolley frame;
   a right side folding assembly configured to be coupled respectively to the top connectors and the bottom connectors of the front right strut assembly and the rear right strut assembly and to be foldable in the lengthwise direction of the trolley frame; and
   a chassis assembly configured to be coupled respectively to the bottom connectors of the front left strut assembly, the rear left strut assembly, the rear left strut assembly and the rear right strut assembly and respectively to the left side folding assembly and the right side folding assembly, and configured to be foldable both in the widthwise and lengthwise directions of the trolley frame,
   wherein each of the front left strut assembly, the rear left strut assembly, the rear left strut assembly and the rear right strut assembly comprises a telescopic rod assembly configured to include an interior rod and a hollow exterior rod in which the interior rod is axially slidable, the respective top connector is secured on an upper end of the interior rod and the respective bottom connector is secured on a lower end of the exterior rod, and wherein in the process that the foldable trolley is being folded for storage, the bottom connectors are axially immovable relative to the respective strut assemblies; and
   wherein the rear end folding assembly comprises:
      a foldable upper connection beam comprised of a left connection beam section and a right connection beam section hingedly coupled to each other, wherein the left connection beam is hingedly coupled with an upper cross-rod and a slant rod in such a way that the upper cross-rod is also hingedly coupled to the top connector of the rear left strut assembly and the slant rod is also hingedly coupled to the bottom connector of the rear left strut assembly, and the right connection beam is hingedly coupled with an upper cross-rod and a slant rod in such a way that the upper cross-rod is also hingedly coupled to the top connector of the rear right strut assembly and the slant rod is also hingedly coupled to the bottom connector of the rear right strut assembly;
      a carrier located below the upper connection beam;
      a first bottom support beam and a second bottom support beam, wherein the first bottom support beam is configured to include a first end and the second bottom support beam is configured to include a first end, both of which first ends are hingedly coupled to each other between the upper connection beam and the carrier, the first bottom support beam is configured to include a second end opposing its first end and the second support beam is configured to include a second end opposing its first end, the second end of the first bottom support beam is hingedly coupled to the bottom connector of the rear right strut assembly and the second end of the second bottom support beam is hingedly coupled to the bottom connector of the rear left strut assembly;
      a first bottom connection beam and a second bottom connection beam, wherein the first bottom connection beam is hingedly coupled between the first bottom support beam and the carrier and the second bottom connection beam is hingedly coupled between the second bottom support beam and the carrier; and
      a first lower cross-rod and a second lower cross-rod, wherein the first lower cross-rod is hingedly coupled between the first bottom support beam and a slip ring of the rear right strut assembly which is linearly slidable relative to its exterior rod, and the second lower cross-rod is hingedly coupled between the second bottom support beam and a slip ring of the rear left strut assembly which is linearly slidable relative to its exterior rod.

6. The foldable trolley as recited in claim 5, wherein the left side folding assembly is configured to include a middle telescopic rod assembly and a first intersecting rod assembly and a second intersecting rod assembly, which first intersecting rod assembly and which second intersecting rod assembly are hingedly coupled respectively to opposing ends of the middle telescopic rod assembly,
   the middle telescopic rod assembly is configured to include an interior rod and an exterior tube configured to be sleeved on the interior rod in such a way that they are linearly slidable relative to each other, wherein the inner rod has a bottom end defining the end to which the first intersecting rod assembly and the second intersecting rod assembly are hingedly coupled, and the exterior tube has a top end defining the other end to which the first intersecting rod assembly and the second intersecting rod assembly are hingedly coupled;
   the first intersecting rod assembly is configured to include a first rod and a second rod intersecting with each other and hingedly coupled to each other at an intersecting location therebetween, wherein the first rod of the first intersecting rod assembly is configured to include a first end hingedly coupled to the top connector of the front left strut assembly and an opposing second end hingedly coupled to the middle telescopic rod assembly, and the second rod of the first intersecting rod assembly is configured to include a first end hingedly coupled to the bottom connector of the front left strut assembly and an opposing second end hingedly coupled to the middle telescopic rod assembly;

the second intersecting rod assembly is configured to include a first rod and a second rod intersecting with each other and hingedly coupled to each other at an intersecting location therebetween, wherein the first rod of the second intersecting rod assembly is configured to include a first end hingedly coupled to the top connector of the rear left strut assembly and an opposing second end hingedly coupled to the middle telescopic rod assembly, and the second rod of the second intersecting rod assembly is configured to include a first end hingedly coupled to the bottom connector of the rear left strut assembly and an opposing second end hingedly coupled to the middle telescopic rod assembly.

7. The foldable trolley as recited in claim 6, wherein the right side folding assembly is configured to include a middle telescopic rod assembly and a first intersecting rod assembly and a second intersecting rod assembly, which first intersecting rod assembly and which second intersecting rod assembly are hingedly coupled respectively to opposing ends of the middle telescopic rod assembly, the middle telescopic rod assembly of the right side folding assembly is configured to include an interior rod and an exterior tube configured to be sleeved on the interior rod in such a way that they are linearly slidable relative to each other, wherein the inner rod has a bottom end defining the end to which the first intersecting rod assembly of the right side folding assembly and the second intersecting rod assembly of the right side folding assembly are hingedly coupled, and the exterior tube has a top end defining the other end to which the first intersecting rod assembly of the right side folding assembly and the second intersecting rod assembly of the right side folding assembly are hingedly coupled;

the first intersecting rod assembly of the right side folding assembly is configured to include a first rod and a second rod intersecting with each other and hingedly coupled to each other at an intersecting location therebetween, wherein the first rod of the first intersecting rod assembly is configured to include a first end hingedly coupled to the top connector of the front right strut assembly and an opposing second end hingedly coupled to the middle telescopic rod assembly, and the second rod of the first intersecting rod assembly of the right side folding assembly is configured to include a first end hingedly coupled to the bottom connector of the front right strut assembly and an opposing second end hingedly coupled to the middle telescopic rod assembly;

the second intersecting rod assembly of the right side folding assembly is configured to include a first rod and a second rod intersecting with each other and hingedly coupled to each other at an intersecting location therebetween, wherein the first rod of the second intersecting rod assembly is configured to include a first end hingedly coupled to the top connector of the rear right strut assembly and an opposing second end hingedly coupled to the middle telescopic rod assembly, and the second rod of the second intersecting rod assembly of the right side folding assembly is configured to include a first end hingedly coupled to the bottom connector of the rear right strut assembly and an opposing second end hingedly coupled to the middle telescopic rod assembly.

8. The foldable trolley as recited in claim 7, wherein the chassis assembly is configured to include:

a first chassis sub-assembly and a second chassis sub-assembly hingedly coupled to each other, wherein the first chassis sub-assembly is hingedly coupled to the bottom connectors of the front left and right strut assemblies and the carrier of the front end folding assembly, and the second chassis sub-assembly is hingedly coupled to the bottom connectors of the rear left and right strut assemblies and the carrier of the rear end folding assembly.

9. The foldable trolley as recited in claim 8, wherein the first chassis sub-assembly is configured to include a first rod piece, a second rod piece, a third rod piece, and a fourth rod piece, wherein the first rod piece is configured to intersect with the second rod piece and be hingedly coupled to the second rod piece at an intersecting location therebetween, and wherein the third rod piece is configured to intersect with the fourth rod piece and be hingedly coupled to the fourth rod piece at an intersecting location therebetween;

the second chassis sub-assembly is configured to include a first rod piece, a second rod piece, a third rod piece, and a fourth rod piece, wherein the first rod piece is configured to intersect with the second rod piece and be hingedly coupled to the second rod piece at an intersecting location therebetween, and wherein the third rod piece is configured to intersect with the fourth rod piece and be hingedly coupled to the fourth rod piece at an intersecting location therebetween.

10. The foldable trolley as recited in claim 9, wherein the first rod piece of the first chassis sub-assembly is configured to include a first end hingedly coupled to the bottom connector of the front left strut assembly, each of the second and third rod pieces of the first chassis sub-assembly is configured to include a first end hingedly coupled to the carrier of the front end folding assembly, and the fourth rod piece of the first chassis sub-assembly is configured to include a first end hingedly coupled to the bottom connector of the front right strut assembly;

the first rod piece of the second chassis sub-assembly is configured to include a first end hingedly coupled to the bottom connector of the rear left strut assembly, each of the second and third rod pieces of the second chassis sub-assembly is configured to include a first end hingedly coupled to the carrier of the rear end folding assembly, and the fourth rod piece of the second chassis sub-assembly is configured to include a first end hingedly coupled to the bottom connector of the rear right strut assembly;

the first chassis sub-assembly is hingedly coupled to the second chassis sub-assembly by their respective first rod pieces, second rod pieces, third rod pieces and fourth rod pieces at opposing second ends of the respective rod pieces.

11. The foldable trolley as recited in claim 10, wherein a pivot axis defined between the first ends of the first, second, third, and fourth rod pieces of the first chassis sub-assembly and the front left strut assembly, the front end folding assembly, the front right strut assembly; a pivot axis defined between the first ends of the first, second, third, and fourth rod pieces of the second chassis sub-assembly and the rear left strut assembly, the rear end folding assembly, the rear right strut assembly; and a pivot axis defined between the first chassis sub-assembly and the second chassis sub-assembly are parallel or substantially parallel to each other.

12. The foldable trolley as recited in claim 11, wherein the second end of the second rod piece of the first chassis sub-assembly and the second end of the second rod piece of the second chassis sub-assembly together are hingedly coupled to a slide bushing which is provided on the middle telescopic rod assembly of the left side folding assembly in such a way that the slide bushing is linearly slidable on the middle telescopic rod assembly;

the second end of the third rod piece of the first chassis sub-assembly and the second end of the third rod piece of the second chassis sub-assembly together are hingedly coupled to a slide bushing which is provided on the middle telescopic rod assembly of the right side folding assembly.

13. The foldable trolley assembly as recited in claim 12, wherein the slide bushing of the left side folding assembly is sleeved on the exterior tube of the middle telescopic rod assembly of the left side folding assembly; and the slide bushing of the right side folding assembly is sleeved on the exterior tube of the middle telescopic rod assembly of the right side folding assembly.

14. The foldable trolley as recited in claim 13, wherein it is further configured to include an auxiliary cross-bar support assembly to support the chassis assembly thereunderneath when the trolley frame is in its unfolded state, the auxiliary cross-bar support assembly is configured to include a first bar and a second bar, a first end of the first bar is hingedly coupled to a first end of the second bar, an opposing second end of the first bar is hingedly coupled to the bottom end of the interior rod of the middle telescopic rod assembly of the left side folding assembly, and an opposing second end of the second bar is hingedly coupled to the bottom end of the interior rod of the middle telescopic rod assembly of the right side folding assembly.

15. The foldable trolley as recited in claim 14, wherein each of the rear left strut assembly and the rear right strut assembly is configured to include a handle grip rod assembly which is parallel or substantially parallel to the telescopic rod assembly of the respective strut assembly, a wheel assembly connected to the rear left strut assembly and a wheel assembly connected to the rear right strut assembly have a common rotational axis which is located between a longitudinal central axis of the telescopic rod assembly of the rear left strut assembly and a longitudinal central axis of the respective handle grip rod assembly of the rear left strut assembly and between a longitudinal central axis of the telescopic rod assembly of the rear right strut assembly and a longitudinal central axis of the respective handle grip rod assembly of the rear right strut assembly.

16. The foldable trolley as recited in claim 15, wherein it is further configured to include a handle grip assembly foldable in the widthwise direction of the trolley frame, and the handle grip assembly is configured to be hingedly coupled to the handle grip rod assembly of the rear left strut assembly and the handle grip rod assembly of the rear right strut assembly.

17. The foldable trolley as recited in claim 16, wherein it is further configured to include a pull rod assembly, which pull rod assembly is configured to include a first end hingedly coupled to the carrier of the front end folding assembly and an opposing second end adaptable to be gripped by a user's hand.

18. The foldable trolley as recited in claim 17, wherein the pull rod assembly is configured to include two outer rods spaced from each other and an inner double-rod piece installed between the outer rods and linearly slidable relative to the outer rods;

the upper connection beam of the front end folding assembly is provided with a holder configured to be in selective engagement with the inner double-rod piece.

19. The foldable trolley as recited in claim 18, wherein it is further configured to include an auxiliary extensible bracket foldable in the widthwise direction of the trolley frame, and the auxiliary extensible bracket is configured to be hingedly coupled to the handle grip rod assemblies of the rear left and right strut assemblies respectively adjacent to the bottom connectors of the rear left and right strut assemblies.

* * * * *